US010970139B2

(12) United States Patent
Marchiori et al.

(10) Patent No.: US 10,970,139 B2
(45) Date of Patent: Apr. 6, 2021

(54) CONTROLLING THE TRIGGERING OF FUNCTION CALLS FROM CONTENT ITEMS

(71) Applicant: Google LLC, Mountain View, CA (US)

(72) Inventors: Eugenio Jorge Marchiori, Belmont, CA (US); Curt Lawrence, Mountain View, CA (US); Richard Earnshaw, Los Altos, CA (US)

(73) Assignee: Google LLC, Mountain View, CA (US)

( * ) Notice: Subject to any disclaimer, the term of this patent is extended or adjusted under 35 U.S.C. 154(b) by 191 days.

(21) Appl. No.: 15/938,990

(22) Filed: Mar. 28, 2018

(65) Prior Publication Data

US 2019/0303215 A1 Oct. 3, 2019

(51) Int. Cl.
*G06F 9/54* (2006.01)
*G06F 3/0488* (2013.01)

(52) U.S. Cl.
CPC ............ *G06F 9/542* (2013.01); *G06F 3/0488* (2013.01); *G06F 9/547* (2013.01)

(58) Field of Classification Search
None
See application file for complete search history.

(56) References Cited

U.S. PATENT DOCUMENTS 6,275,232 B1 8/2001 Cataudella et al.
2011/0138355 A1 6/2011 Gutz et al.
2014/0361982 A1* 5/2014 Shaffer

FOREIGN PATENT DOCUMENTS

EP 1 403 765 A1 3/2004

OTHER PUBLICATIONS

International Preliminary Report on Patentability on PCT PCT/US2018/049977 dated Oct. 8, 2020.
International Search Report of the International Searching Authority on PCT/US2018/049977 dated Oct. 3, 2019.
Written Opinion of the International Searching Authority on PCT/US2018/049977 dated Oct. 3, 2019.

* cited by examiner

*Primary Examiner* — Syed A Roni
(74) *Attorney, Agent, or Firm* — Foley and Lardner LLP

(57) ABSTRACT

Systems and methods for verifying interactions performed on content items are hereby provided. An interaction verifier encoded in a first portion of code of a content item can detect a first interaction event attributed to the content item. The interaction verifier can identify, via execution of a second portion of code of the content item, a registration of a function call to perform a predetermined action. The function call can be configured to be triggered in response to the application passing a second interaction event to the content item. The interaction verifier can determine that an amount of time between the first interaction event and the registration of the function call is less than a predetermined threshold. The interaction verifier can cause the application to perform the predetermined action in response to determining that the amount of time is less than the predetermined threshold.

20 Claims, 10 Drawing Sheets

CONTROLLING THE TRIGGERING OF FUNCTION CALLS FROM CONTENT ITEMS

BACKGROUND

In computer networked environments such as the Internet, content providers can provide content items to be inserted into an information resource (e.g., a webpage) processed and rendered by an application (e.g., a web browser) executing on a client device. Such content items and the information resource can be interacted with using an input/output (I/O) device connected to the client device.

SUMMARY

At least one aspect is directed to a method of verifying interactions performed on content items. A data processing system having one or more processors can insert an interaction verification script at a first portion of code of a content item. The interaction verification script can detect a first interaction event attributed to the content item. The first interaction event can be passed to the script by an application configured to present the content item on an information resource on which the content item is presented responsive to the application detecting an interaction with the content item. The interaction verification script can identify, via execution of a second portion of code of the content item, a registration of a function call to perform a predetermined action. The function call can be triggered in response to the application passing a second interaction event to the content item. The second interaction event can be attributed to the content item and generated in response to the interaction with the content item. The interaction verification script can determine that an amount of time between detecting the first interaction event and identifying the registration of the function call is less than a predetermined threshold. The interaction verification script can cause the application to perform the predetermined action in response to determining that the amount of time between detecting the first interaction event and identifying the registration of the function call is less than the predetermined threshold.

In some implementations, the interaction verification script can detect the first interaction event including a first on-click event attributed to the content item subsequent to a touch-start event and a touch-end event. The first on-click event can be processed by an on-click event handler of the content item. In some implementations, the interaction verification script can detect the second interaction event including a second on-click event attributed to the content item subsequent to the first on-click event. The second on-click event can be processed by the on-click event handler of the content item. In some implementations, the interaction verification script can determine that the amount of time between the second on-click event and the first on-click event is less than the predetermined threshold.

In some implementations, the interaction verification script can detect the second interaction event including a touch-end event attributed to the content item. The touch-end event can be processed by a touch-end event handler of the content item. The touch-end event handler for the touch-end event can be configured with the function call to perform the predetermined action. In some implementations, the interaction verification script can register, responsive to detecting the touch-end event, the function call for performing the predetermined action without executing the predetermined action. In some implementations, the interaction verification script can detect the first interaction event including an on-click event attributed to the content item subsequent to the touch-end event, the on-click event processed by an on-click event handler of the content item.

In some implementations, the interaction verification script can determine, responsive to the detection of the first interaction event, that the detection of the first interaction event precedes the registration of the function call. In some implementations, the interaction verification script can set the predetermined threshold based on the determination that the detection of the first interaction event precedes the registration of the function call. In some implementations, the interaction verification script can detect the first interaction event attributed to the content item via a first event handler for processing a first type of interaction corresponding to the first interaction event. In some implementations, the interaction verification script can detect the second interaction event attributed to the content item via a second event handler for processing at least one of the first type of interaction and a second type of interaction corresponding to the second interaction event. In some implementations, the interaction verification script can cause the application to perform the predetermined action via an application program interface (API) function call.

In some implementations, the data processing system can identify an event handler for processing the second interaction event in the second portion of code of the content item matching one of the plurality of predetermined event handlers for performing the predetermined action. The event handler can be pre-configured to perform the predetermined function. In some implementations, inserting the interaction verification script can include attaching the event handler to a predetermined plurality of event handlers in the first portion of the code of the content item. The first portion of code can be executed by the application running on the client prior to execution of the second portion of code.

At least one aspect is directed to a system for verifying interactions performed on content items. The system can include an event detector encoded in a first portion of code of a content item and executable on one or more processors. The event detector can detect a first interaction event attributed to the content item. The first interaction event can be passed to the script by an application configured to present the content item on an information resource on which the content item is presented responsive to the application detecting an interaction with the content item. The system can include a registration logger encoded in the first portion of code and executable on the one or more processors. The registration logger can identify, via execution of a second portion of code of the content item, a registration of a function call to perform a predetermined action. The function call can be configured to be triggered in response to the application passing a second interaction event to the content item. The second interaction event can be attributed to the content item and generated in response to the interaction with the content item. The system can include a function activator encoded in the first portion of code and executable on the one or more processors. The function activator can determine that an amount of time between detecting the first interaction event and identifying the registration of the function call is less than a predetermined threshold. The function activator can cause the application to perform the predetermined action in response to determining that the amount of time between detecting the first interaction event and identifying the registration of the function call is less than the predetermined threshold.

In some implementations, the event detector can detect the first interaction event including a first on-click event attributed to the content item subsequent to a touch-start event and a touch-end event. In some implementations, the event detector can detect the second interaction event including a second on-click event attributed to the content item subsequent to the first on-click event. The second on-click event can be processed by the on-click event handler of the content item. The event handler for the second on-click event can be configured with the function call to perform the predetermined action. In some implementations, the registration logger can identify the registration of the function call, in response to the detection of the second interaction event including the second on-click event attributed to the content item In some implementations, the event detector can detect the first interaction event including an on-click event attributed to the content item subsequent to the touch-end event. The on-click event can be processed by an on-click event handler of the content item. In some implementations, the event detector can detect the second interaction event including a touch-end event attributed to the content item. The touch-end event can be processed by a touch-end event handler of the content item. The touch-end event handler for the touch-end event can be configured with the function call to perform the predetermined action. In some implementations, the registration logger can identify the registration of the function call, in response to the detection of the second interaction event including the touch-end event handler In some implementations, the event detector can identify the first interaction event as paired with the second interaction event from a plurality of attached interaction events, the plurality of attached interaction events including at least one of an on-click event and a touch-end events. In some implementations, the function activator can determine that the amount of time between detecting the first interaction event and identifying the registration of the function call associated is less than the predetermined threshold, responsive to identifying the first interaction event as paired with the second interaction event.

In some implementations, the function activator can determine that the detection of the first interaction event precedes the registration of the function call. In some implementations, the function activator can set the predetermined threshold based on the determination that the detection of the first interaction event precedes the registration of the function call. In some implementations, the function activator can cause the application to perform the predetermined action in response to determining that the amount of time is less than the predetermined threshold subsequent to the detection of the second interaction event.

In some implementations, the function activator can determine that the detection of the first interaction event succeeds the registration of the function call. In some implementations, the function activator can set the predetermined threshold based on the determination that the detection of the first interaction event succeeds the registration of the function call. In some implementations, the function activator can cause the application to perform the predetermined action in response to determining that the amount of time is less than the predetermined threshold subsequent to the detection of the first interaction event. In some implementations, at least one of the event detector, the registration logger, and the function activator encoded in the first portion of code of the content item can be executable by the application prior to the execution of the second portion of code of the content item.

At least one aspect is directed to a method of verifying interactions performed on content items. An interaction verifier encoded in a first portion of code of a content item and executing on one or more processors can detect a first interaction event attributed to the content item. The first interaction event can be passed to the script by an application configured to present the content item on an information resource on which the content item is presented responsive to the application detecting an interaction with the content item. The interaction verifier can identify, via execution of a second portion of code of the content item, a registration of a function call to perform a predetermined action. The function call can be configured to be triggered in response to the application passing a second interaction event to the content item. The second interaction event can be attributed to the content item and generated in response to the interaction with the content item. The interaction verifier can determine that an amount of time between detecting the first interaction event and identifying the registration of the function call is less than a predetermined threshold. The interaction verifier can cause the application to perform the predetermined action in response to determining that the amount of time between detecting the first interaction event and identifying the registration of the function call is less than the predetermined threshold.

In some implementations, detecting the first interaction event can include detecting the first interaction event including a first on-click event attributed to the content item subsequent to a touch-start event and a touch-end event. In some implementations, the interaction verifier can detect the second interaction event including a second on-click event attributed to the content item subsequent to the first on-click event. The second on-click event can be processed by the on-click event handler of the content item, the event handler for the second on-click event configured with the function call to perform the predetermined action. In some implementations, identifying the registration of the function call can include identifying the registration of the function call, in response to the detection of the second interaction event including the second on-click event attributed to the content item.

In some implementations, detecting the first interaction event can include detecting the first interaction event including an on-click event attributed to the content item subsequent to the touch-end event, the on-click event processed by an on-click event handler of the content item. In some implementations, the interaction verifier can detect the second interaction event including a touch-end event attributed to the content item. The touch-end event can be processed by a touch-end event handler of the content item. The touch-end event handler for the touch-end event can be configured with the function call to perform the predetermined action. In some implementations, identifying the registration of the function call can include identifying the registration of the function call, in response to the detection of the second interaction event including the touch-end event handler.

In some implementations, the interaction verifier can identify the first interaction event as paired with the second interaction event from a plurality of attached interaction events, the plurality of attached interaction events including at least one of an on-click event and a touch-end events. In some implementations, determining that the amount of time is less than the predetermined threshold can include determining that the amount of time between detecting the first interaction event and identifying the registration of the function call associated is less than the predetermined threshold, responsive to identifying the first interaction event as paired with the second interaction event.

In some implementations, the interaction verifier can determine that the detection of the first interaction event precedes the registration of the function call. In some implementations, the interaction verifier can set the predetermined threshold based on the determination that the detection of the first interaction event precedes the registration of the function call. In some implementations, causing the application to perform the predetermined action can include causing the application to perform the predetermined action in response to determining that the amount of time is less than the predetermined threshold subsequent to the detection of the second interaction event.

In some implementations, the interaction verifier can determine that the detection of the first interaction event succeeds the registration of the function call. In some implementations, the interaction verifier can set the predetermined threshold based on the determination that the detection of the first interaction event succeeds the registration of the function call. In some implementations, causing the application to perform the predetermined action can include causing the application to perform the predetermined action in response to determining that the amount of time is less than the predetermined threshold subsequent to the detection of the first interaction event.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
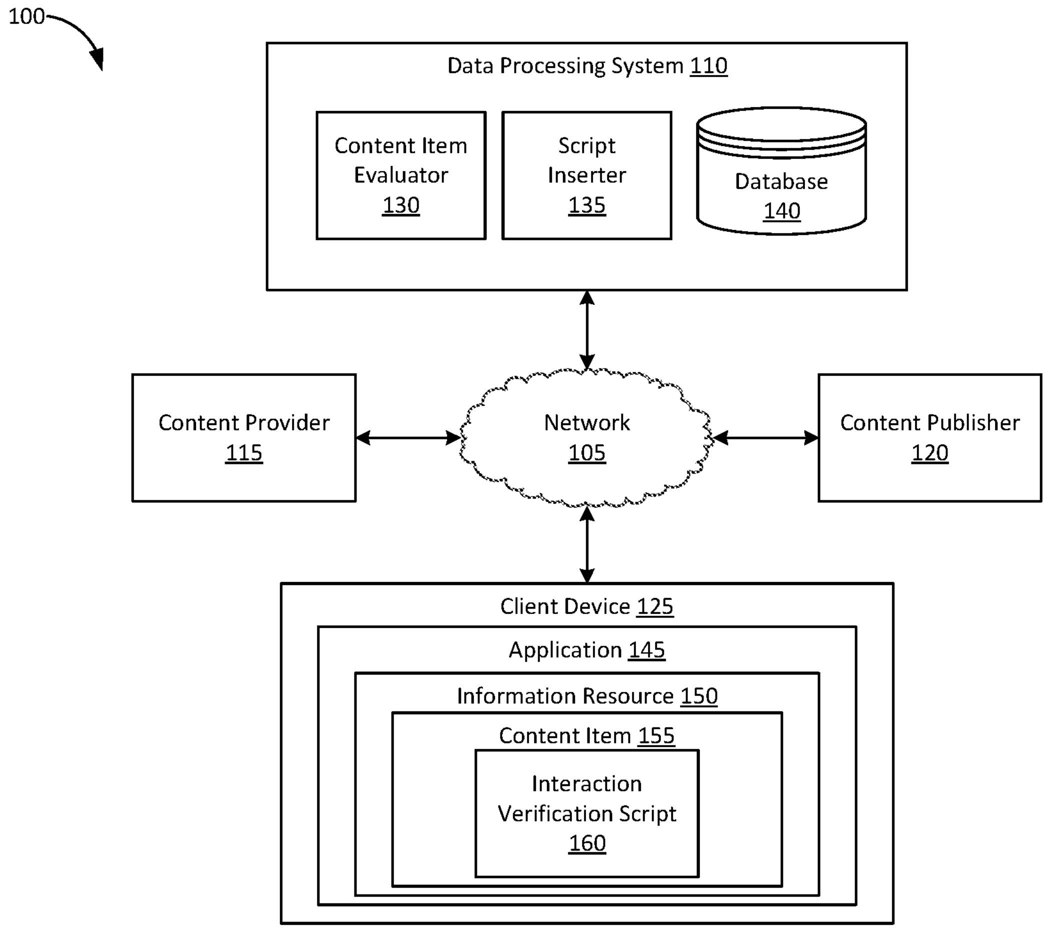
FIG. 1 is a block diagram depicting a computer networked environment for verifying interactions performed on content items, according to an illustrative implementation.

Following below are more detailed descriptions of various concepts related to, and implementations of, methods, apparatuses, and systems of verifying interactions performed on content items. The various concepts introduced above and discussed in greater detail below may be implemented in any of numerous ways, as the described concepts are not limited to any particular manner of implementation.

A content item can be inserted into a content slot (e.g., an inline frame element) of an information resource (e.g., a webpage), and can include executable code to be read by an application (e.g., a web browser) executing on a client device. The executable code of the content item can be in the form of Hypertext Markup Language (HTML) (e.g., HTMLS) with Cascading Style Sheets (CSS) and JavaScript™, among others. The executable code can include various event handlers (sometimes referred to as event listeners) to respond to various interaction events passed from an input/output (I/O) device connected to the device via the application. Each event handler can correspond to a particular type of interaction event, and can be configured to respond to interaction events differently. Certain event handlers may be configured to trigger a particular function (e.g., an application programming interface (API) function to navigate to another information resource) in response to the corresponding interaction event. Other event handlers may be configured to not perform any action in response to the respective interaction event.

Inconsistent configurations of event handlers across different content items can yield discrepancies in behavior, such as in the timing of the triggering of the function call configured for the respective event handler. This problem may be exacerbated, when multiple event handlers are called in response to a single, physical interaction by a user with the I/O device. For instance, a single touch by the user on a touchscreen of a mobile smartphone can result in the calling of a touch-start, touch-end, scroll, and on-click event handlers. Some content items can be configured to trigger the function call in response to the touch-end event handler, whereas other content items can be configured to trigger the function call in response to the on-click event handler. The variation in configuration of these event handlers that can be all called in response to a single, physical interaction can lead to unwanted or inadvertent interactions from the perspective of the end user. Furthermore, such an interaction may lead to a premature or delayed triggering of the function call relative to the time expected by the end user. As such, the disconformity in the behavior and functionality of the content items may ensue in the reduction in the quality of human-computer interaction (HCI) with the content item and the information resource. In addition, the resulting function call may lead to wasting of computer processing resources, excess consumption of network bandwidth, and unnecessary utilization of power. Such deleterious effects of the inadvertent function call may be exacerbated, when the end user takes steps on the client device to correct and retrieve the previous state of the information resource prior to the interaction.

Existing approaches to address the divergence from the expected behavior of the content item can result in a deterioration or breakdown in the other functionalities of the content item. One existing technique may be restricting a set of function calls allowed to be triggered from the event handlers of the content item. Under this approach, each function call from the event handlers of the content item may be validated to verify that the function call is used in specific contexts with permitted parameters. The validation of the function call in this manner, however, may be difficult and may result in a significant delays to other functionalities of the content item. Another existing technique may be to replace the originally programmed event handlers with new event handlers. With this approach, the new event handler may be configured to trigger the specified function call in response to detecting the corresponding interaction event. Supplanting the originally programmed event handler, however, can be error prone and can lead to unexpected consequences, especially when the function calls that were to be called with the originally programmed event handler are not taken into account.

To address these and other technical challenges, each content item to be served on the information resource may be modified to include an interaction verification script to prevent unexpected triggering of function calls from the event handlers of the content item. The interaction verification script can be inserted into a top portion of the executable code for the content item, such that the application executes the script prior to the subsequent executable code such as the event handler. Upon execution by the application on the client device, the interaction verification script can cause the application to wait for a detection of an interaction event for a designated event handler and a registration of the specified function. The interaction verification script can cause the application to modify the triggering of the specified function based on the timing of the detection and the registration. The interaction verification script can cause the application to detect the interaction event attributed to the content for the designated event handler. The event handler can be configured with the specified function. The event handler can be configured without the specified function, and can be one of a pre-designated set of event handlers. The detection of the interaction event can occur prior or subsequent to the registration of the function.

When the interaction event attributed to the content item for the designated event handler occurs first, the interaction verification script can cause the application to wait for the registration of the particular function for a predetermined time limit. If the registration of the function call does not occur within the predetermined time limit, the interaction verification script can cause the application to ignore the detected event. On the other hand, if the registration of the function occurs within the predetermined time limit, the interaction verification script can cause the application to allow the registered function to be carried out and executed. Conversely, when the interaction event for the designated event handler occurs subsequent to the registration of the specified function, the interaction verification script can cause the application to determine whether the detection and the registration occurred within the predetermined time limit. If the detection and the registration are determined to occur within the predetermined time limit, the interaction verification script can allow the registered function to be carried out and executed. On the other hand, if the detection and the registration are determined to occur outside the predetermined time limit, the interaction verification script can cause the application to ignore the detection of the interaction event and prevent the execution of the registered function. In this manner, the content item can behave differently and the premature or delayed triggering of the response different from when the user expected may be prevented, thereby increasing the quality of interactions with the content item and the underlying information resource.

Referring now to FIG. 1, FIG. 1 is a block diagram depicting one implementation of a computer networked environment 100 for verifying interactions performed on content items. The environment 100 includes at least one data processing system 110. Although only one data processing system 110 is illustrated, in many implementations, data processing system 110 may be a farm, cloud, cluster, or other grouping of multiple data processing systems or computing devices. The data processing system 110 can include at least one processor and a memory, sometimes referred to as a processing circuit, each of which are discussed in more detail below in connection with FIG. 6. The memory stores processor-executable instructions that, when executed by processor, cause the processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language.

The network 105 can include computer networks such as the internet, local, wide, metro or other area networks, intranets, satellite networks, other computer networks such as voice or data mobile phone communication networks, and combinations thereof. The data processing system 110 of the system 100 can communicate via the network 105, such as at least one content provider 115, at least one content publisher 120, or at least one client device 125. The network 105 may be any form of computer network that relays information between the client device 125, data processing system 110, and one or more content sources, such as the content provider 115 or the content publisher 120. For example, the network 105 may include the Internet and/or other types of data networks, such as a local area network (LAN), a wide area network (WAN), a cellular network, satellite network, or other types of data networks. The network 105 may also include any number of computing devices (e.g., computer, servers, routers, network switches, etc.) that are configured to receive and/or transmit data within network 105. The network 105 may further include any number of hardwired and/or wireless connections. The client device 125 may communicate wirelessly (e.g., via WiFi, cellular, radio, etc.) with a transceiver that is hard-wired (e.g., via a fiber optic cable, a CATS cable, etc.) to other computing devices in network 105.

The content provider 115 can include servers or other computing devices operated by a content provider entity to provide content items 155 for display on information resources at the client device 125. The content provided by the content provider 115 can take any convenient form. For example, the third-party content may include content related to other displayed content and may be, for example, pages of a website that are related to displayed content. The content may include third party content items or creatives (e.g., ads) for display on information resources, such as an information resource 150 including primary content provided by the content publisher 120. The content items 155 can also be displayed on a search results web page. For instance, the content provider 115 can provide or be the source of content items 155 for display in content slots (e.g., inline frame elements) of the information resource 150, such as a web page of a company where the primary content of the web page is provided by the company, or for display on a search results landing page provided by a search engine. The content items 155 associated with the content provider 115 can be displayed on information resources 150 besides webpages, such as content displayed as part of the execution of an application on a smartphone or other client device 125.

The content publisher 120 can include servers or other computing devices operated by a content publishing entity to provide information resources 150 including primary content for display via the network 105. For instance, the content publisher 120 can include a web page operator who provides primary content for display on the information resource 150. The information resource 150 can include content other than that provided by the content publisher 120, and the information resource 150 can include content slots configured for the display of content items 155 from the content provider 115. For instance, the content publisher 120 can operate the website of a company and can provide content about that company for display on web pages of the website. The web pages can include content slots configured for the display of content items 155 provided by the content provider 115 or by the content publisher 120 itself. In some implementations, the content publisher 120 includes a search engine computing device (e.g. server) of a search engine operator that operates a search engine website. The primary content of search engine web pages (e.g., a results or landing web page) can include results of a search as well as third party content items 155 displayed in content slots of the information resource 150 such as content items 155 from the content provider 115. In some implementations, the content publisher 120 can include one or more servers for providing video content.

The client devices 125 can include computing devices configured to communicate via the network 105 to display data such as the content provided by the content publisher 120 (e.g., the information resource 150) and the content provided by the content provider 115 (e.g., the content item 155 for display in a content slot of the information resource 150). The client device 125, the content provider 115, and the content publisher 120 can include desktop computers, laptop computers, tablet computers, smartphones, personal digital assistants, mobile devices, consumer computing devices, servers, clients, digital video recorders, a set-top box for a television, a video game console, or any other computing device configured to communicate via the network 105. The client devices 125 can be communication devices through which an end user can submit requests to receive content. The requests can be requests to a search engine and the requests can include search queries. In some implementations, the requests can include a request to access a web page.

The content provider 115, the content publisher 120 and the client devices 125 each can include a processor and a memory as part of a processing circuit. The memory stores machine instructions that, when executed by processor, cause processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language.

The content provider 115, the content publisher 120, and the client devices 125 may each also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the content provider 115, the content publisher 120 and the client devices 125 (e.g., a built-in display, microphone, etc.) or external to the housing of content provider 115, the content publisher 120 and the client devices 125 (e.g., a monitor connected to the client device 125, a speaker connected to the client device 125, etc.), according to various implementations. For example, the content provider 115, the content publisher 120 and the client devices 125 may include an electronic display, which visually displays web pages using webpage data received from one or more content sources and/or from the data processing system 110 via the network 105. In some implementations, a content placement campaign manager or third-party content provider can communicate with the data processing system 110 via the content provider 115. In some implementations, the content provider can communicate with the data processing system 110 via a user interface displayed on the user interface devices of the content provider 115.

The client device 125 can execute an application 145. The application 145 can include, for example, an Internet browser, a mobile application, or any other computer program capable of executing or otherwise invoking computer-executable instructions processed by the client device 125, such as the computer-executable instructions included in the information resource 150 and the content item 155. The information resource 150 included therein can correspond to a script, logic, markup, or instructions (e.g., HyperText Markup Language (HTML), Extensible HyperText Markup Language (XHTML), Extensible Markup Language (XML), Cascading Style Sheets (CSS), and JavaScript, or any combination thereof). The information resource 150 may include a header 162 and a body 164. The content item 146 may be inserted into the information resource 150.

To fetch one of the information resources 150, the application 145 of the client device 125 can send a request for a resource to the content publisher 120. The request can include an address for the information resource 150, a device identifier, a device type, and an application profile, among other data. The address may be a Universal Resource Locator (URL), and can include a protocol, a hostname, and a file pathname, among other parameters. The hostname may correspond to the content publisher 120. The file pathname may correspond to one of the information resources 150 hosted by the content publisher 120. The device identifier may correspond to the client device 125. The device type may correspond to system configurations of the client device 125. The application profile may indicate which application (e.g., web browser type and version, etc.) is running on the client device 125 to execute and run the information resource 150. Once the request is sent, the network 105 may forward the request to the content publisher 120 as identified in the hostname.

Subsequently, the content publisher 120 can receive the request from the application 145. In turn, the content publisher 120 can parse the request to identify the information resource 150 to provide to the client device 125. In some implementations, the content publisher 120 can access a database to retrieve the information resource 150. The database may be a part of the content publisher 120, in communication with the content publisher 120, or otherwise accessible by the content publisher 120. The content publisher 120 can identify the information resource 150 to provide based on the hostname and the file pathname included in the request. Upon identifying the information resource 150, the content publisher 120 can transmit or send the information resource 150 to application 145 of the client device 125. In some implementations, the information resource 150 can have one or more content slots for inserting content items 155 provided by the content provider 115 or the data processing system 110. In some implementations, the information resource 150 can have one or more content slots with content items 155 from the content publisher 120. In some implementations, the content items 155 may be pre-inserted or may be provided with the information resource 150 to the application 145 running on the client device 125.

For processing the information resource 150, the application 145 can include any number of components, such as a document tree generator, rendering tree generator, and a display module. In reading the information resource 150, the document tree generator can parse the information resource 150 to generate a Document Object Model (DOM) tree of the information resource 150 arranged in a hierarchical manner. Using the DOM tree, the rendering tree generator can generate a rendering tree specifying the visual properties or attributes of the content items of the information resource. The display module can render and display the information resource onto a display of the client device 125 based on the rendering tree. The application 145 can also parse the CSS and the JavaScript of the information resource 150.

While the information resource 150 is processed, the application 145 can parse a content slot of the information resource 150. The content slot may include an address corresponding to the content item 155. The address may be a Universal Resource Locator (URL), and can include a protocol, a hostname, and a file pathname, among other parameters. The hostname may correspond to the content provider 115 (e.g., for first party content), content publisher 120 (e.g., for third-party content), or the data processing system 110. The file pathname may correspond to one of the content items 155 maintained by the content provider 115, the content publisher 120, or the data processing system 110. In some implementations, the application 145 can use the address to access the content publisher 120 to retrieve additional content to insert into the information resource 150. In some implementations, the address may be used in generation of a request for content to the content provider 115. In some implementations, the address may be a placeholder for the content item 155 to be selected by the data processing system 110 in a content selection process. Using the address included in the content slot, the application 145 can generate the request for content to insert into the information resource 150. The request can include the address for the content item 155, a device identifier, a device type, and an application profile, among other data. The device identifier may correspond to the client device 125. The device type may correspond to system configurations of the client device 125. The application profile may indicate which application (e.g., web browser type and version, etc.) is running on the client device 125 to execute and run the information resource 150. Once the request is sent, the network 105 may forward the request to the content provider 115 or the data processing system 110 as identified in the hostname.

Subsequently, the content provider 115 or the data processing system 110 can receive the request for content from the application 145. In turn, the content provider 115 or the data processing system 110 can parse the request to identify the content item 155 to provide to the client device 125. Upon identifying the content item 155, the content provider 115 or the data processing system 110 can transmit or send the content item 155 to application 145 of the client device 125 to insert into the information resource 150. The content item 155 may include an interaction verification script 160 (also referred to as an interaction verifier). Details regarding the functionality of the interaction verification script 160 are provided herein below.

The data processing system 110 can include at least one server. In some implementations, the data processing system 110 can include a plurality of servers located in at least one data center or server farm. In some implementations, the data processing system 110 includes a content placement system. The data processing system 110 can include at least one content item evaluator 130, at least one script inserter 135, and at least one database 140. The content item evaluator 130 and the script inserter 135 each can include at least one processing unit, server, virtual server, circuit, engine, agent, appliance, or other logic device such as programmable logic arrays configured to communicate with the database 140 and with other computing devices (e.g., the content provider 115, the content publisher 120, or the client device 125) via the network 105.

The content item evaluator 130 and the script inserter 135 can each include at least one processing unit, server, virtual server, circuit, engine, agent, appliance, or other logic device such as programmable logic arrays configured to communicate with the database 140 and with other computing devices (e.g., the content provider 115, the content publisher 120, and the client device 125) via the network 105. The content item evaluator 130 and the script inserter 135 can each include or execute at least one computer program or at least one script. The content item evaluator 130 and the script inserter 135 can be separate components, a single component, or part of the data processing system 110. The content item evaluator 130 and the script inserter 135 can include combinations of software and hardware, such as one or more processors configured to execute one or more scripts.

The data processing system 110 can also include one or more content repositories or databases 140. The databases 140 can be local to the data processing system 110. In some implementations, the databases 140 can be remote to the data processing system 110 but can communicate with the data processing system 110 via the network 105. The databases 140 can include the content items 155 provided by the content provider 115 or the reference addresses identifying each content item 155. In some implementations, the databases 140 can include the information resources 150 provided by the content publisher 120 or the reference addresses identifying each information resources 150. The databases 140 can also include an interaction verification script 160 to provide to the content provider 115, the content publisher 120, or the client device 125. Details of the interaction verification script 160 are provided herein below.

The content item evaluator 130 can identify one or more content items 155 of the content provider 115. In some implementations, the content item evaluator 130 can identify the one or more content items 115 in response to receiving the request for content from the client device 125. In some implementations, the content item evaluator 130 can identify the one or more content items 115, independent of the request for content from the client device 125. In some implementations, the content item evaluator 130 can access the database 140 for the content items 155 of the content provider 115. In some implementations, the content item evaluator 130 can receive the content items 155 from the content provider 115. The content provider 115 can transmit a request to modify the content items 155 to the content item evaluator 130. The request to modify can include the content item 155. Each content item 155 can be indexed by a content item identifier (e.g., an address or an alphanumeric set of characters). The content item evaluator 130 can parse the request to identify the content items 155. For each content item 155 identified, the content item evaluator 130 can parse the executable code of the content item 155. The executable code of the content item 155 can include code in the form of markup (e.g., HTML and CSS) and scripting language code (e.g., JavaScript™). From parsing the executable code of the content item 155, the content item evaluator 130 can identify one or more event handlers (also referred to as event listeners). In some implementations, the content item evaluator 130 can parse the scripting language code of the content item 155 to identify the one or more event handlers. Each event handler of the content item 155 can be a routine (e.g., an asynchronous callback subroutine) for processing a corresponding interaction event passed from the application 145 of the client device 125 to the information resource 150 or to the content item 155. For example, the content item 155 may include an on-click event handler for processing a click interaction event and a keypress event handler for processing a keyboard press.

Among the event handlers of the content item 155, the content item evaluator 130 can identify one or more event handlers configured with a function to perform a predetermined action responsive to detecting a corresponding interaction event. At least one of the event handlers may be configured with the function to perform the predetermined action. The function may be one of a predesignated set of functions to be searched for by the content item evaluator 130. In some implementations, the function and the predetermined action to be performed in response to a triggering of the function may be defined by an application programming interface (API). For example, the function call may be a "ExitAPI.exit( )" to navigate from a current information resource accessed or loaded by the application 145 to another information resource who address is specified by the function call. In some implementations, the content item evaluator 130 can parse the executable code of each event handler of the content item 155 to identify the one or more event handlers that are configured with the function to perform the predetermined action.

The content item evaluator 130 can traverse the event handlers identified for the content item 155 to identify the function to perform the predetermined action. The content item evaluator 130 can traverse of the event handlers for the content item 155 in response to receipt of the request for content from the client device 125 or independent of the receipt of the request. In parsing the executable code of each event handler, the content item evaluator 130 can identify a string of the executable code matching a predefined string for the function to perform the predetermined action. If the string for the executable code for the event handler does not include the string for the function, the content item evaluator 130 can identify the event handler as not configured with the function. Conversely, if the string for the executable code for the event handler includes the string for the function, the content item evaluator 130 can identify the event handler as configured with the function to perform the predetermined function.

In some implementations, the content item evaluator 130 can determine whether the content item 155 includes one or more event handlers of a predefined list of event handlers expected to be included in the content item 155. The content item 155 can also lack or exclude some event handlers. For instance, the executable code for the content item 155 can have an express definition for an on-click event handler, but lack any code for a touch-start handler. The predefined list of expected event handlers can include or specify one or more event handlers to be attached, bound, or paired to the event handler identified as configured with the function. The predefined list of expect event handlers may be maintained on the database 140. In some implementations, the content item evaluator 130 can traverse through the event handlers included in the content item 155. As the event handlers included in the content item 155 are traversed, the content item evaluator 130 can determine whether the event handler matches one of the predefined list of expected event handlers. By traversing through the event handlers of the content item 155, the content item evaluator 130 can determine which event handlers of the predefined list of expected event handlers are not included in the content item 155. The content item evaluator 130 can insert or include event handlers not initially included in the content item 155 of the predefined list of expected event handlers into the executable code of the content item 155. The inserted event handler may be initially be null and may be configured to perform no action in response to detecting a corresponding interaction event. The content item evaluator 130 can also identify the inserted event handler as not configured with the function.

For each event handler of the content item 155 identified by the content item evaluator 130 as not configured with the function, the script inserter 135 can determine whether the event handler matches one of a predefined list of event handlers. The predefined list of event handlers can include or specify one or more event handlers to be attached, bound, or paired to the event handler identified as configured with the function. The predefined list of event handlers may be maintained on the database 140. The predefined list of event handlers can include a set or a group of event handlers predetermined to be called in conjunction with a single, physical interaction by a user at the client device 125. For example, when the user contacts a point on a touchscreen at the client device 125, a touch-start event, a touch-end event, and a click event if the physical contact is relatively short duration of time or a scroll event if the physical contact is for a relatively long duration of time may be called. In view of this, the predefined list of event handlers can be defined to include the touch-end event and the on-click event.

The script inserter 135 can traverse through the one or more event handlers identified as not configured with the function to determine whether to attach to the interaction verification script 160 or the event handler identified as configured with the function. While traversing the one or more event handlers identified as not configured with the function, the script inserter 135 can compare the event handler identified as not configured with the function to one of the predefined list of event handlers. If the event handler is identified as not matching any on the predefined list of event handlers, the script inserter 135 maintain the event handler as is. In this manner, the original functionality of the event handler may be maintained. On the other hand, if the event handler is identified as matching one of the predefined list of event handlers, the script inserter 135 can attach the event handler identified as not configured with the function to the one or more event handlers identified as configured with the function (e.g., using the JavaScript™ function "addEventListener( )"). In either case, the script inserter 135 can determine whether there are more event handlers not configured with the function. If there are more event handlers identified as not configured with the function, the script inserter 135 can identify the next event handler identified as not configured with the function, and repeat the function. Otherwise, if there are no more event handlers identified as not configured with the function, the script inserter 135 can proceed to insert the interaction verification script 160 into the content item 155.

The script inserter 135 can insert or include the interaction verification script 160 into the content item 155. In some implementations, the script inserter 135 can parse the content item 155 to determine whether the content item 155 is previously configured with or already includes the interaction verification script 160. If the content item 155 is determined to be previously configured with or already include the interaction verification script 160, the script inserter 135 can send the content item 155 without further modifications. Otherwise, if the content item 155 is determined to not be previously configured with or does not include the interaction verification script 160, the script inserter 135 can insert the interaction verification script 160 into the content item 155. The interaction verification script 160 may be inserted by the script inserter 135 into a portion of the executable code prior to another portion of the executable code including the one or more event handlers. In this manner, the application 145 executing at the client device 125 will process and execute the interaction verification script 160 prior to the event handlers included in the subsequent executable code. In some implementations, the script inserter 135 can insert or include the attachment of the event handlers into the portion of the executable code of the content item 155 prior to the portions of the executable code including the event handlers. In some implementations, the script inserter 135 can attach the event handler identified as not configured with the function on the predefined list of event handlers and the event handlers identified as configured with the function to the interaction verification script 160.

In some implementations, the script inserter 135 can insert the interaction verification script 160 outside the content item 155. The interaction verification script 160 when inserted outside the content item 155 can interface with the one or more event handlers of the content item 155. The script inserter 135 can insert the interaction verification script 160 into the information resource 150. In some implementations, the script inserter 135 can insert the interaction verification script 160 into the content slot (e.g., an inline frame) of the information resource 150 for the content item 155. In some implementations, the script inserter 135 can insert the interaction verification 160 as a shadow DOM tree element. The shadow DOM tree element may be part of the content slot of the information resource 150 for the content item 155. Details regarding the functionality of the interaction verification script 160 are provided herein below.

Figure 2:
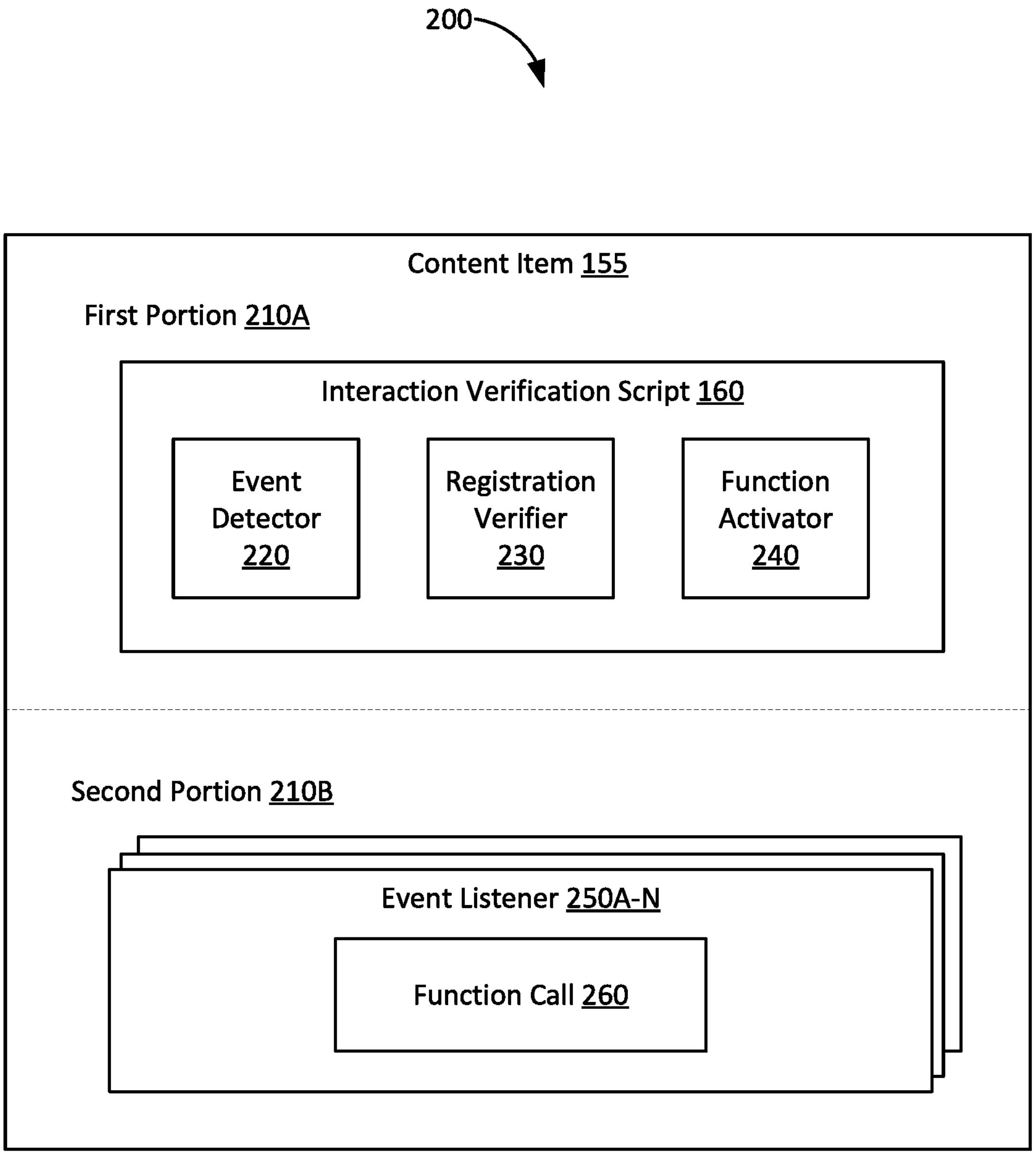
FIG. 2 is a block diagram depicting a system for verifying interactions performed on content items, according to an illustrative implementation.

Now referring to FIG. 2, depicted is a system 200 for verifying interactions performed on content items. The system 200 can include some or all the elements of the environment 100, and may represent a more detailed configuration of the content item 155 and the interaction verification script 160 described above in connection with FIG. 1. In overview, the system 200 can include the content item 155 inserted in the information resource 150 provided to the application 145 running on the client device 125. Each component of the system 200 can be stored as instructions on memory to be executed by one or more processors of the client device 125 in the manner specified by the application 145. The content item 155 can include the interaction verification script 160 in a first portion 210A of the executable code for the content item 155. The interaction verification script 160 can include an event detector 220, a registration logger 230, and a function activator 240. The content item 155 can also include one or more event handlers 250A-N in a second portion 210B of the executable code for the content item 155.

With the receipt of the content item 155 from the content provider 115 or the data processing system 110, the application 145 can insert the content item 155 into a content slot (e.g., an inline frame element) of the information resource 150. The application 145 running on the client device 125 can parse, execute, and present the content item 155 in accordance to the executable code therein. In processing the content item 155, the application 145 can sequentially parse and read the executable code of the content item 155 from top to bottom. In some implementations, the application 145 can execute the event detector 220, the registration logger 230, or the function activator 240 of the interaction verification script 160 in the first portion 210A of the executable code prior to executing the one or more event handlers 250A-N in the second portion 210B of the executable code. In this manner, the functionalities of the interaction verification script 160 encoded in the first portion 210A of the executable code for the content item 155 may be executed prior to any of the event handlers 250A-N encoded in the second portion 210B of the executable code. In some implementations, when the interaction verification script 160 is inserted into the information resource 150 outside the content item 155 (e.g., in an inline frame defining the content slot for the content item 155), the application 145 can execute the executable code corresponding to interaction verification script 160 prior to the executable code for the content item 155.

The event detector 220 can monitor for one or more interaction events attributed to the content item 155. The interaction event can correspond to an interaction or a gesture by a user with any input/output (I/O) device of the client device 125. The interaction event can include a touch-start event, a touch-end event, a touch-move, a long press event, an on-scroll event, an on-fling event, a mouse-up event, a mouse-down event, an on-click event, a double-click event, a key-up event, a key-down event, a keypress event, a mouse-move event, a mouse-up event, a mouse-down event, a mouse-scroll event, and a mouse-wheel event, among others. The interaction event may be detected by the application 145 and may be passed from the I/O device of the client device 125 via the application 145 to the information resource 150 or the content item 155. The application 145 can determine whether the interaction event is attributed to the content item 155. In some implementations, the application 145 can determine that the interaction event is attributed to the content item 155, when a coordinate of the interaction event is within a range of coordinates corresponding to the content item 155. If the interaction event is determined to be attributed to the content item 155, the application 145 can pass the interaction event to the content item 155 for processing by the executable code therein.

Multiple interaction events may be passed and the corresponding event handlers 250A-N of the content item 155 may be triggered in response to a single interaction by the user with the I/O device of the client device 125. With the single interaction upon a point on a touchscreen of the client device 125 corresponding to a rendering of the content item 155, the application 145 can pass a touch-start event and a touch-end event in sequence to the content item 155. The application 145 can pass one or more addition events based on a change in position and a time duration of the user interaction, among other factors. Based on the change in position during the user interaction, the application 145 can also pass an on-scroll event or a touch-move event, among others, between the touch-start event and the touch-end event to the content item 155. If the time duration of the user interaction is greater than a predetermined time threshold, the application 145 can also pass a long press event subsequent to the touch-start event and the touch-end event to the content item 155. Conversely, if the time duration of the user interaction is less than or equal to a predetermined time threshold, the application 145 can also pass an on-click event subsequent to the touch-start event and the touch-end event to the content item 155.

The event detector 220 can receive, identify, or detect the one or more interaction events passed by the application 145. Since the event detector 220 is encoded in the first portion 210A of the executable code, the event detector 220 can receive or detect the interaction event prior to the triggering of the corresponding event handler 250A-N for the interaction event encoded in the second portion 210B of the executable code. Furthermore, the same interaction event passed from the application 145 can be detected or registered multiple times, by the event detector 220 encoded in the first portion 210A and then by the corresponding event handler 250A-N encoded in the second portion 210B of the content item 155. In some implementations, the event detector 220 can detect the one or more interaction events in sequence as the interaction events are passed by the application 145 to the content item 115. When the user interaction is with the touchscreen of the client device 125, the event detector 220 can detect a touch-start event and a touch-end event in sequence passed by the application 145. In some implementations, the event detector 220 can detect an on-scroll event or a touch-move event between the touch-start event and the touch-end event. In some implementations, the event detector 220 can detect an on-click event subsequent to the touch-start event and the touch-end event. Whether the interaction verification script 160 is to respond to the detected interaction event may be dependent on which corresponding event handler 250A-N is configured with the function 260.

Subsequent to the detection of each interaction event by the event detector 220, the event handler 250A-N corresponding to the interaction event can process the interaction event. Each event handler 250A-N can process a particular type of interaction event. For example, a touch-start event handler can process a touch-start event, an on-scroll event handler can process an on-scroll event, a touch-end event handler can process a touch-end event, and an on-click event handler can process an on-click event, and so forth. A subset of the event handlers 250A-N may be attached as specified in the interaction verification script 160. In some implementations, the subset of event handlers 250A-N can be attached to one another or the event detector 220, the registration logger 230, or the function activator 240. The remaining set of event handlers 250A-N may perform the programmed functionalities without any effect from the interaction verification script 160. In some implementations, the event detector 220 can act in reporting mode. While in reporting mode, the event detector 220 can generate a diagnostic message including the particular type of interaction and the function 260 configured for the event handler 250A-N. The event detector can transmit the diagnostic message to the data processing system 110. In this manner, diagnostic messages aggregated over a multitude of client devices 125 may be used to determine or measure the behavior of the content item 155. Furthermore, while in reporting mode, the event detector 220 can maintain the originally programmed functionalities of the content item 155, such as the one or more event handlers 250A-N. The event detector 220 can also disable the functionalities of the function activator 240.

At least one event handler 250A-N (hereinafter generally referred to as event handler 250A) can be configured with a function 260 to perform a predefined action in response to the interaction event passed from the content item 155. Other event handlers 250A-N (hereinafter generally referred to as event handler 250B) can be configured without the function 260. As such, the event handler 250A can call or trigger the function 260 to perform the predefined action in response to detection or receipt of the corresponding interaction event passed from the application 145 to the content item 155. As discussed above, the function 260 can include one of a predesignated set of functions specified by the content item evaluator 130. In some implementations, the function and the predetermined action to be performed in response to a triggering of the function may be defined by an application programming interface (API) (e.g., "ExitAPI.exit( )" to navigate from the information resource 150 accessed or loaded by the application 145 to another information resource). The event handler 250A can be a touch-end event or an on-click event, among others. In contrast, the event handler 250B can perform no actions or can call other functionalities besides the function 260 in response to the detection or receipt of the corresponding interaction event passed from the application 145 to the content item 155. The event handler 250B can be a touch-end event or an on-click event, among others. In some implementations, the type of the interaction event processed by the event handler 250B can differ from the type of interaction event processed by the event handler 250A. For example, the event handler 250A may be a touch-end event handler configured with the function 260, while the event handler 250B may be an on-click event handler.

Upon detecting the interaction event passed by the application 145, the event detector 220 can determine whether the interaction event corresponds to one of the attached event handlers 250A-N as specified in the interaction verification script 160. As discussed above, the attached event handlers 250A-N can be any one of the event handlers specified by the predefined list of event handlers maintained in the database 140. In some implementations, the attached event handlers 250A-N can include the touch-start event handler, the touch-end scroll handler, and the on-click event handler, among others. If the interaction event is determined not to correspond to any of the attached event handlers 250A-N, the corresponding event handler 250A-N (if any are configured in the content item 155) can process the interaction event. On the other hand, if the interaction event is determined to correspond to one of the attached event handlers 250A-N, the event detector 220 can identify a time of the detection of the interaction event corresponding to the event handler 250A-N. In some implementations, the event detector 220 can maintain a timer to keep track of a time. In some implementations, the event detector 220 can determine whether the interaction event corresponds to the event handler 250A configured with the function 260. If the interaction event is determined to correspond to the event handler 250A configured with the function 260, the event detector 220 can identify the time of the detection of the interaction event corresponding to the event handler 250A. The event detector 220 can also start counting the timer from the detection of the interaction event corresponding to the event handler 250A to wait for detection of another interaction event corresponding to one of the attached event handlers 250A-N.

As the event detector 220 monitors for the interaction events, the registration logger 230 can identify or monitor for a registration of the calling of the function 260 for performing the predetermined action. In response to detecting that one of the event handlers 250A-N is called, the registration logger 230 can identify which event handler 250A-N is called. In some implementations, the registration logger 230 can identify which event handler 250A-N is to be called, in response to detecting the corresponding interaction event passed by the application 145. Using the identification of which event handler 250A-N is triggered, the registration logger 230 determine whether the event handler 250A configured with the function 260 is triggered or whether the event handler 250B without the configuration is triggered. If the event handler 250A is determined to be triggered in response to the corresponding interaction event, the registration logger 230 can register the calling of the function 260 configured in the event handler 250A. In some implementations, upon detecting the interaction event corresponding to the event handler 250A, the registration logger 230 can register the calling of the function 260. The registration logger 230 can keep track and store the registration of the calling of the function 260 in memory local to the client device 125. When the corresponding interaction event for the event handler 250A is passed from the application 145 to the content item 155, the event handler 250A can call or trigger the function 260. In some implementations, in registering the calling of the function 260, the registration logger 230 can prevent or hold the execution of the predetermined action for the function 260. The registration logger 230 can identify a time of the registration of the calling of the function 260. In some implementations, the registration logger 230 can maintain a timer to keep track of time. In response to the registration of the calling of the function 260, the registration logger 230 can start counting of the timer from the time of the registration to wait for detection of another interaction event corresponding to one of the attached event handlers 250A-N.

On the other hand, if the event handler 250B is determined to be triggered in response to the corresponding interaction event, the registration logger 230 can identify the registration of the calling of the function 260 configured in the event handler 250A. In some implementations, the triggering of the event handler 250B may occur prior to the triggering of the event handler 250A. When the event handler 250B is triggered prior to the triggering of the event handler 250A, the registration logger 230 can identify that there is no registration of the calling of the function. The registration logger 230 can also wait for the triggering of the event handler 250A, and can continue monitoring for the registration of the function call 260. In some implementations, the triggering of the event handler 250B may occur subsequent to the triggering of the event handler 250A. When the event handler 250B is triggered subsequent to the triggering of the event handler 250A, the function 260 configured in the event handler 250A may have already been called and the registration logger 230 may have registered the calling of the function 260.

Using the timing of detection of the interaction event corresponding to one of the attached event handlers 250A-N and the registration of the calling of the function 260 in relation to a predetermined threshold (e.g., a time window), the function activator 240 can cause the application 145 to perform the predetermined action of the function 260. The function activator 240 can determine whether one or more interaction events corresponding to the attached event handlers 230A-N are detected. As discussed above, the attached event handlers 230A-N can include the event handler 250A configured with the function 260 and the event handler 250B without the configuration. For each interaction event corresponding to the one of the attached event handlers 230A-N determined to be detected, the function activator 240 can identify the time for the interaction event. If none of the interaction events are determined to be detected, the function activator 240 can wait on detection of any of the interaction events passed by the application 145. The function activator 240 can also determine whether the calling of the function 260 is registered. If the calling of the function 260 is determined to be registered, the function activator 240 can identify the time of the registration of the calling of the function 260. If the calling of the function 260 is determined to be not registered, the function activator 240 can wait on the registration of the calling of the function 260. In response to detecting the interaction event or the registration of the calling of the function 260, the function activator 240 can compare the time of the detection of the interaction event with the time of the registration.

The function activator 240 can determine whether detection of the interaction event corresponding to one of the attached event handlers 250A-N precedes or succeeds the registration of the calling of the function 260 of the event handler 250A. To determine whether the detection of the interaction event precedes or succeeds the registration of the calling of the function 260, the function activator 240 can compare the time of the detection of the interaction event with the time of the registration. The function activator 240 can determine that the detection of the interaction event precedes the registration of the calling of the function 260, when the interaction event corresponding to any one of the attached event handlers 250A-N is detected first and the calling of the function 260 is not registered. The interaction event can correspond to the event handler 250A configured with the function 260 or the event handler 250B without the configuration of the function 260. The function activator 240 can also determine that the detection of the interaction event precedes the registration of the calling of the function 260, when the time of the detection of the interaction event is prior to the time of the registration of the calling of the function 260. Conversely, the function activator 240 can determine that the detection of the interaction event succeeds the registration of the calling of the function 260, when the calling of the function 260 is registered first and none of the interaction events corresponding to any of the attached event handlers 250A-N is detected. The function activator 240 can also determine that the detection of the interaction event succeeds the registration of the calling of the function 260, when the time of the detection of the interaction event is subsequent to the time of the registration of the calling of the function 260.

Based on whether the detection of the interaction event precedes or succeeds the registration of the calling of the function 260, the function activator 240 can set the predetermined threshold between the detection and the registration. The predetermined threshold may be set to account for an amount of time expected to elapse as the application 145 executes the function activator 240 and then the corresponding event handler 250A-N in processing the interaction event received from the I/O device of the client device 125. If the detection of the interaction event is determined to precede the registration of the calling of the function 260, the function activator 240 can set the predetermined threshold to one value from a predetermined range of time (e.g., 1000 ms to 2000 ms). The function activator 240 can set the predetermined threshold based on the type of event handler 250A configured with the function 260. For example, if a touch-end event handler is configured with the function 260, the function activator 240 can set the predetermined threshold to 1500 ms. On the other hand, if the detection of the interaction event is determined to succeed the registration of the calling of the function 260, the function activator 240 can set the predetermined threshold to another value from a different predetermined range of time (e.g., 50 ms to 350 ms). The function activator 240 can set the predetermined threshold based on the type of event handler 250B configured without the function 260. In some implementations, the function activator 240 can set the predetermined threshold to the same, fixed value, regardless of whether the detection of the interaction event precedes or succeeds the registration of the calling of the function 260.

The function activator 240 can determine whether an amount of time between detection of the interaction event corresponding to one of the attached event handlers 250A-N and the registration of the calling of the function 260 is less than the predetermined threshold. If the interaction event corresponding to one of the attached event handlers 250A-N besides the event handler 250A is detected prior to the registration, the function activator 240 can wait for the registration of the calling of the function 260 within the predetermined threshold. In some implementations, the function activator 240 can maintain a timer to count the time from the detection of the interaction event. The function activator 240 can compare the amount of time elapsed from the detection of the interaction event to the predetermined threshold. Conversely, if the registration of the calling of the function 260 occurs prior to the detection of the interaction event, the function activator 240 can wait for the detection of the interaction event corresponding to one of the attached event handlers 250A-N within the predetermined threshold. In some implementations, the function activator 240 can maintain a timer to count the time from the registration of the calling of the function 260. The function activator 240 can compare the amount of time elapsed from the registration of the calling of the function 260 to the predetermined threshold.

If the detection of the interaction event and the registration of the calling of the function 260 are determined to have occurred within the predetermined threshold, the function activator 240 can cause the application 145 to perform the predetermined action of the function 260. In some implementations, the function activator 240 can permit the triggering of the function 260 configured in the event handler 250A. In some implementations, the function activator 240 can retrieve the registration of the calling of the function 260 to execute the predetermined action. In contrast, if the detection of the interaction event and the registration of the calling of the function 260 are determined to not have occurred within the predetermined threshold, the function activator 240 can prevent the execution of the predetermined function of the function 260. In some implementations, the function activator 240 can ignore the interaction event.

In this manner, the interaction verification script 160 can cause the content item 155 to behavior differently to prevent the triggering of the function 260 prematurely or delayed relative to when the user expected. The interaction verification script 160 may thus increase the quality of interactions with the content item 155 and the underlying information resource 150. Furthermore, the originally programmed functionalities of content item 155 (e.g., the event handlers 250A-N) may be preserved, as the interaction verification script 160 may have minimal impact to the configuration of the remainder of the content item 155.

Figure 3A:
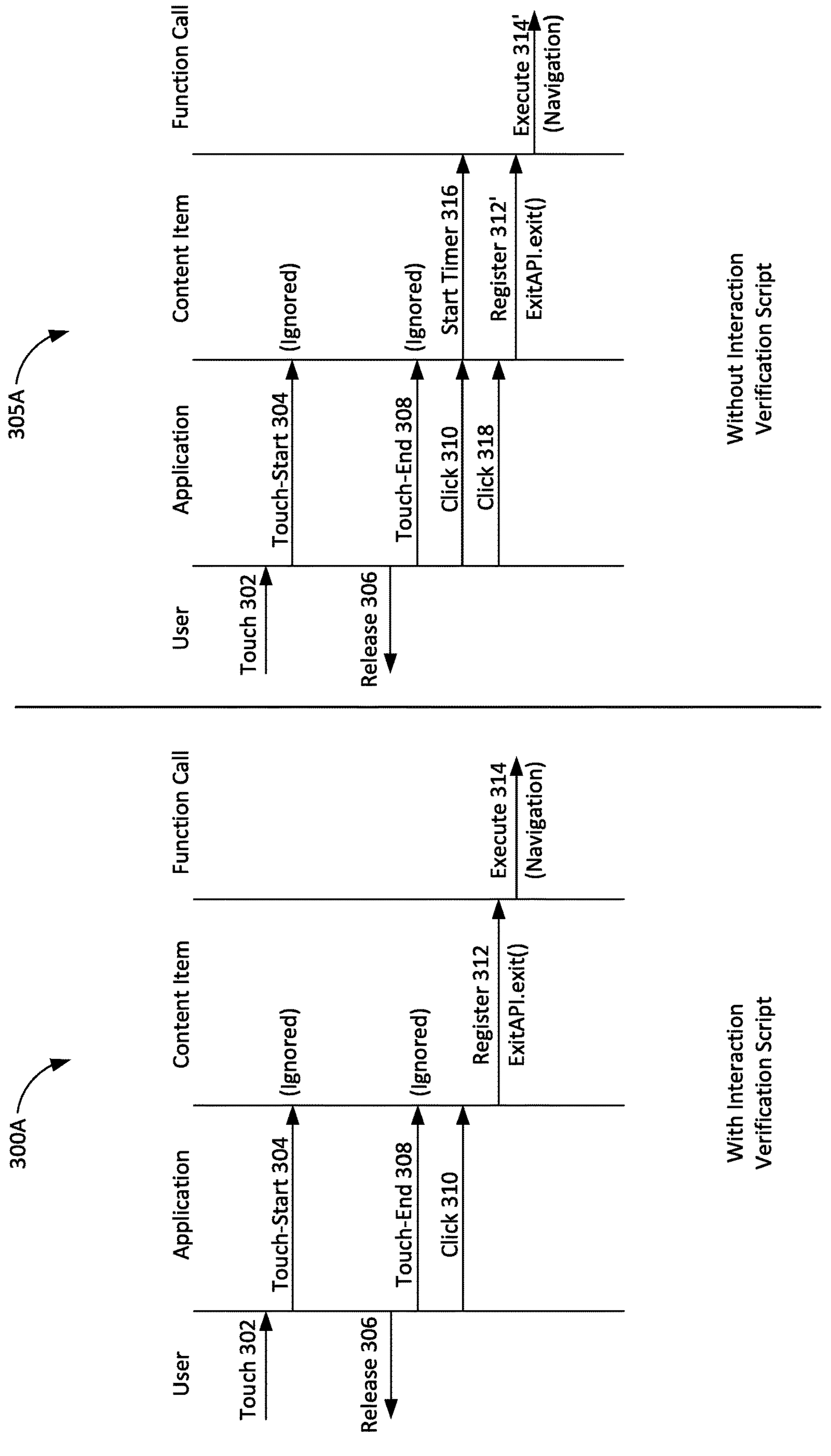
FIGS. 3A-3D are sequence diagrams, each depicting a process of verifying interactions performed on content items, according to an illustrative implementation.

Now referring to FIG. 3A, depicted is a sequence diagram for a process of verifying interactions performed on content items. In overview, process 300A may include the functionality of the content item 155 shown sequentially in relation to the application 150 and the function 260 without the interaction verification script 160. Process 305A may include the functionality of the content item 155 shown sequentially in relation to the application 150 and the function 260 with the interaction verification script 160. In both process 300A and 305A, an on-click event handler of the content item 155 may have been configured to trigger the function 260 to perform the predetermined function. The interaction verification script 160 may have attached the on-click event handler with a touch-end event handler of the content item 155.

Under process 300A, a user of the client device 125 may perform a touch 302 onto a point on a touchscreen corresponding to a rendering of the content item 155 presented within the information resource 150. The application 145 can translate the touch 302 into a touch-start event 304 to pass to the content item 155. As a touch-start event handler of the content item 155 may lack the configuration of the function 260, the content item 155 can ignore the touch-start event 304 or perform another operation different from the function 260. Upon a release 306 of the touch 302 from the touchscreen of the client device 125, the application 145 can translate the release 306 into a touch-end event 308 and an on-click event 310 following the touch-end event 308. The touch 302 and the release 306 may be part of the same interaction by the user with the touchscreen of the client device 125. As a touch-end event handler of the content item 155 may lack the configuration of the function 260, the content item 155 can ignore the touch-end event 308 or perform another operation different from the function 260. The content item 155, however, may be configured with the on-click event handler to trigger the function 260. In response to detecting the on-click event 310, the content item 155 can perform a registration 312 of the function 260 (e.g., "ExitAPI.exit( )" to navigate to another information resource). The application 145 may then perform an execution 314 of the function 260 (e.g., a navigation to the other information resource).

Under process 305A, the functionalities may be similar or the same to the process 300A until the on-click event 310. At this point, the on-click event 310 may pass through the interaction verification script 160 first prior to the original on-click event handler. As such, the registration 312 may occur subsequent to processing by the interaction verification script 160. In accordance to the interaction verification script 160, the content item 155 can start a timer 316 to wait for a subsequent interaction event. The application 145 can also translate the release 306 by the user into another on-click event 318 to pass to the on-click event handler of the content item 155. Upon detection of the on-click event 318, the on-click event handler can perform a registration 312' of the function 260. If the interaction verification script 160 determines that the start of the timer 316 and the registration 312' are within a predetermined time window (e.g., 200 ms), the interaction verification script 160 can permit the application 145 to perform an execution 314' of the function 260.

Figure 3B:
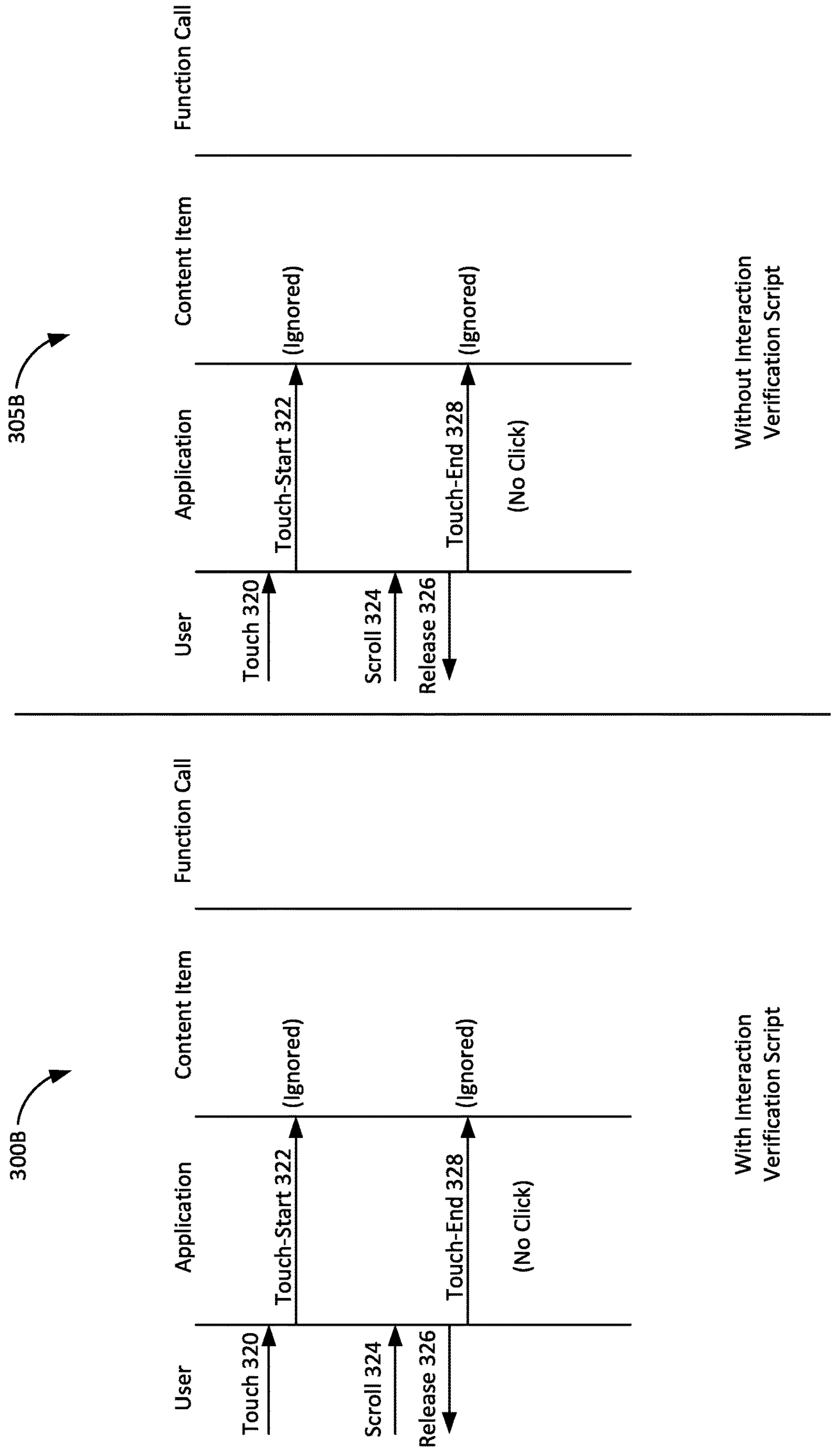

Now referring to FIG. 3B, depicted is a sequence diagram for a process of verifying interactions performed on content items. In overview, process 300B may include the functionality of the content item 155 shown sequentially in relation to the application 150 and the function 260 without the interaction verification script 160. Process 305B may include the functionality of the content item 155 shown sequentially in relation to the application 150 and the function 260 with the interaction verification script 160. As in processes 300A and 305A detailed in connection with FIG. 3A, in processes 300B and 305B, an on-click event handler of the content item 155 may have been configured to trigger the function 260 to perform the predetermined function. In addition, the interaction verification script 160 may have attached the on-click event handler with a touch-end event handler of the content item 155.

Under process 300B, a user of the client device 125 may perform a touch 302 onto a point on a touchscreen corresponding to a rendering of the content item 155 presented within the information resource 150. The application 145 can translate the touch 302 into a touch-start event 304 to pass to the content item 155. As a touch-start event handler of the content item 155 may lack the configuration of the function 260, the content item 155 can ignore the touch-start event 322 or perform another operation different from the function 260. Subsequently, the user of the client device 125 may perform a scroll 324 by moving from one point on the touchscreen to another point. Upon a release 326 of the touch 320 and the following scroll 324 from the touchscreen of the client device 125, the application 145 can translate the release 326 into a touch-end event 328. The touch 320 and the release 326 may be part of the same interaction by the user with the touchscreen of the client device 125. An on-click event may not be triggered as the scroll 324 occurred prior to the release 326. As a touch-end event handler of the content item 155 may lack the configuration of the function 260, the content item 155 can ignore the touch-end event 308 or perform another operation different from the function 260. Process 305B may be similar to process 300B, as the content item 155 has been configured to trigger the function 260 in response to an on-click event, not an on-touch event 328.

Figure 3C:
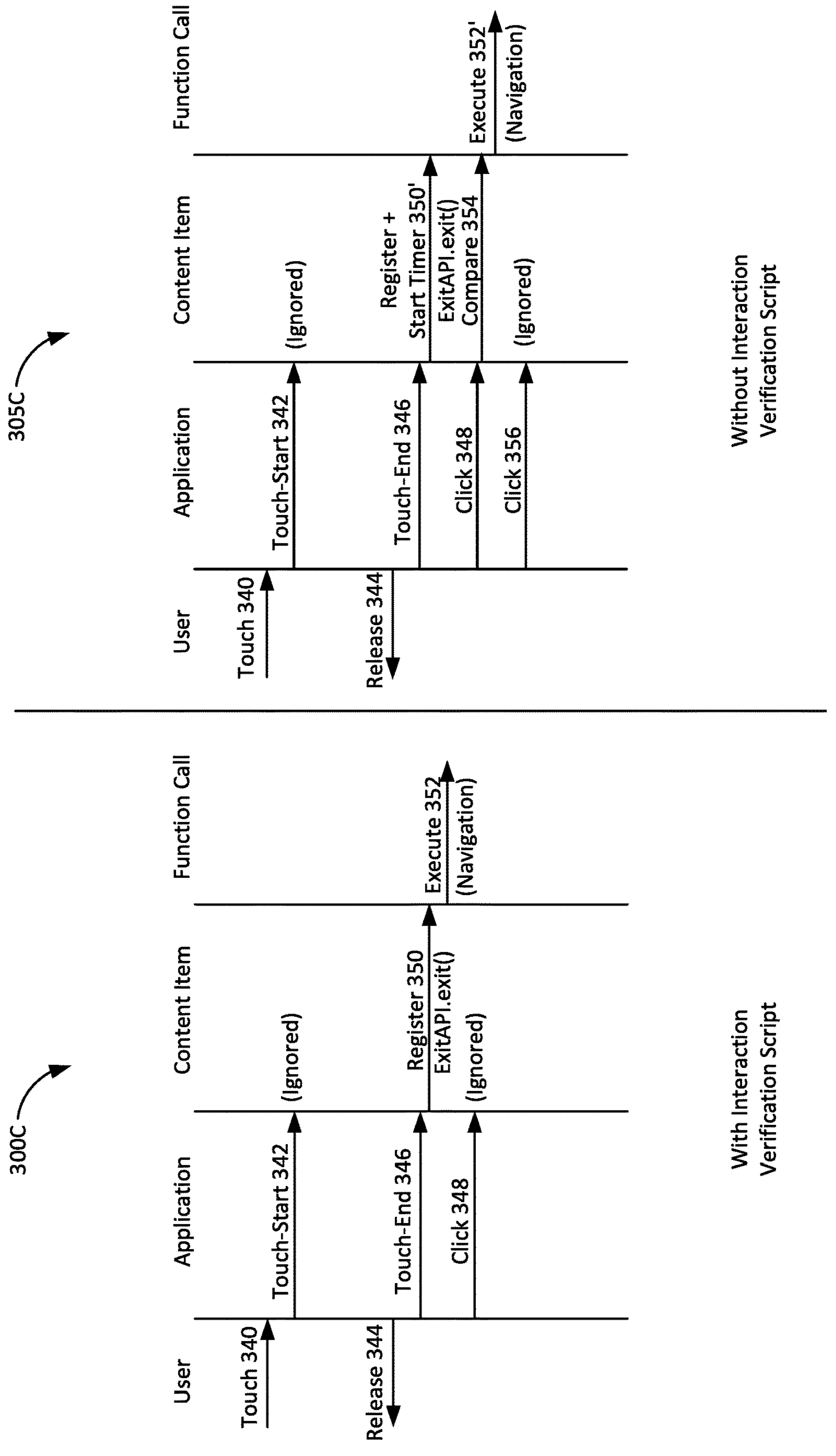

Now referring to FIG. 3C, depicted is a sequence diagram for a process of verifying interactions performed on content items. In overview, process 300C may include the functionality of the content item 155 shown sequentially in relation to the application 150 and the function 260 without the interaction verification script 160. Process 305C may include the functionality of the content item 155 shown sequentially in relation to the application 150 and the function 260 with the interaction verification script 160. In both processes 300B and 305B, a touch-end event handler of the content item 155 may have been configured to trigger the function 260 to perform the predetermined function. The interaction verification script 160 may have attached the touch-end event handler with an on-click event handler of the content item 155.

Under process 300C, a user of the client device 125 may have performed a touch 340 onto a point on a touchscreen corresponding to a rendering of the content item 155 presented within the information resource 150. The application 145 can translate the touch 340 into a touch-start event 342 to pass to the content item 155. As a touch-start event handler of the content item 155 may lack the configuration of the function 260, the content item 155 can ignore the touch-start event 340 or perform another operation different from the function 260. Upon a release 344 of the touch 340 from the touchscreen of the client device 125, the application 145 can translate the release 344 into a touch-end event 346 and an on-click event 348 following the touch-end event 346. The touch 340 and the release 344 may be part of the same interaction by the user with the touchscreen of the client device 125. As the touch-end event handler may have been configured to trigger the function 260 in response to detecting the touch-end event 346, the content item 155 can perform a registration 350 of the function 260 (e.g., "ExitAPI.exit( )" to navigate to another information resource). The application 145 may then perform an execution 352 of the function 260 (e.g., a navigation to the other information resource). In contrast, as the on-click event handler may lack the configuration of the function 260, the content item 155 may ignore the subsequent on-click event 348. From the perspective of the user, because the triggering of the function 260 is tied to the touch-end event handler instead of the on-click event handler, the execution 352 of the function 260 may appear premature and may be unexpected.

Under process 305C, the functionalities may be similar or the same as the process 300B until the touch-end event 346. At this point, the touch-end event 346 may pass through the interaction verification script 160 to the original touch-end event handler of the content item 155. In response to detecting the touch-end event 346, the content item 155 can perform a registration 350' of the calling of the function 260 and can start a timer to wait for another interaction event corresponding to one of the attached event handlers, in accordance with the interaction verification script 160. When the subsequent on-click event 348 is received, the content item 155 can perform a comparison 354 of the timing of the registration 350' and the receipt of the on-click event 348. If the registration 350' of the calling of the function 260 and the receipt of the on-click event 348 are determined to occur within a predetermined time window (e.g., 1500 ms), the interaction verification script 160 can permit the application 145 to perform an execution 352' of the function 260. In this manner, the premature or unexpected triggering of the function 260 may be prevented.

Figure 3D:
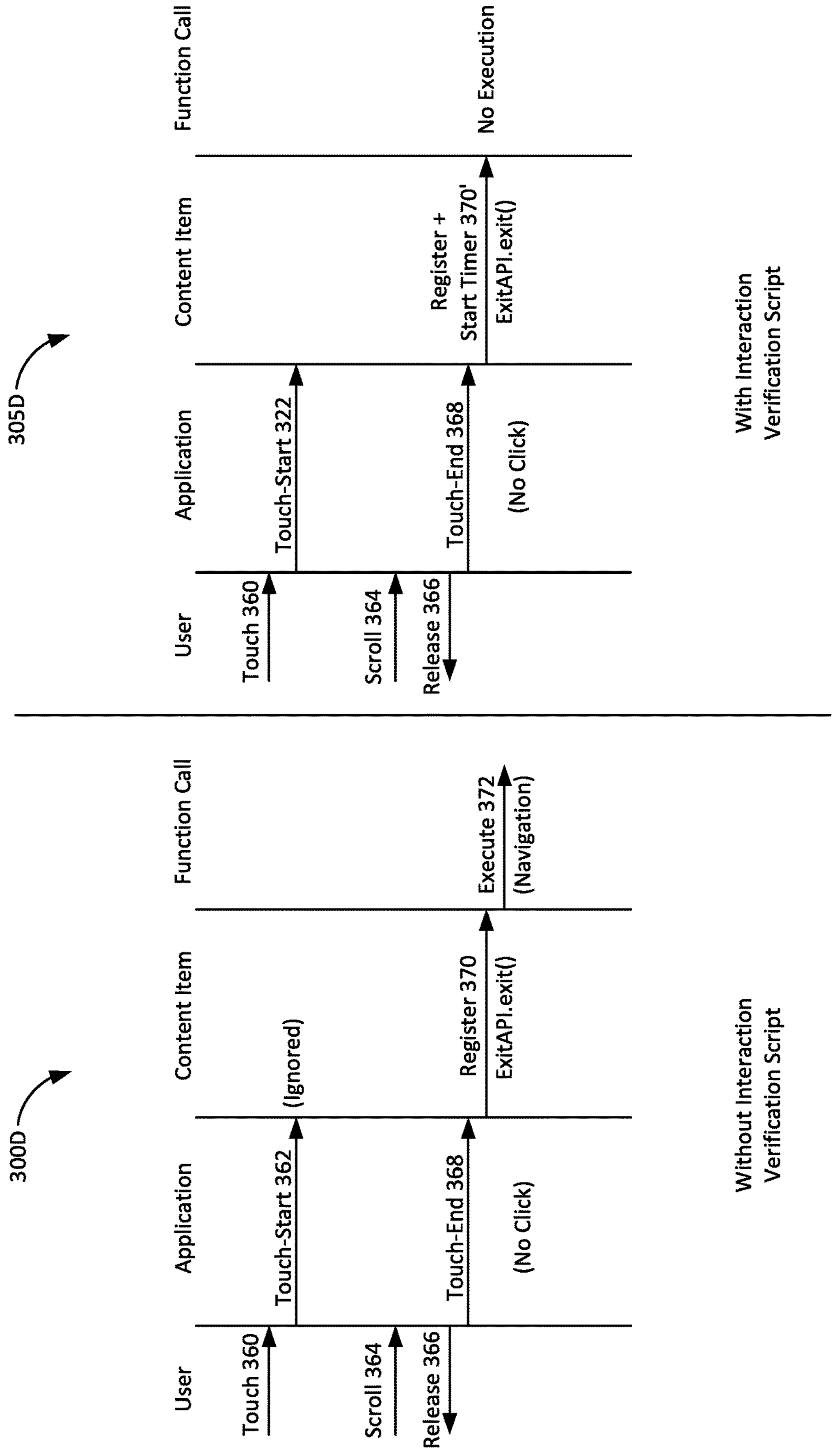

Now referring to FIG. 3D, depicted is a sequence diagram for a process of verifying interactions performed on content items. In overview, process 300D may include the functionality of the content item 155 shown sequentially in relation to the application 150 and the function 260 without the interaction verification script 160. Process 305D may include the functionality of the content item 155 shown sequentially in relation to the application 150 and the function 260 with the interaction verification script 160. As in processes 300C and 305C detailed in connection with FIG. 3C, in processes 300D and 305D, a touch-end event handler of the content item 155 may have been configured to trigger the function 260 to perform the predetermined function. The interaction verification script 160 may have attached the touch-end event handler with an on-click event handler of the content item 155.

Under process 300D, a user of the client device 125 may have performed a touch 360 onto a point on a touchscreen corresponding to a rendering of the content item 155 presented within the information resource 150. The application 145 can translate the touch 360 into a touch-start event 362 to pass to the content item 155. As a touch-start event handler of the content item 155 may lack the configuration of the function 260, the content item 155 can ignore the touch-start event 362 or perform another operation different from the function 260. Subsequently, the user of the client device 125 may perform a scroll 364 by moving from one point on the touchscreen to another point. Upon a release 366 of the touch 360 and the following scroll 364 from the touchscreen of the client device 125, the application 145 can translate the release 366 into a touch-end event 368. The touch 360 and the release 366 may be part of the same interaction by the user with the touchscreen of the client device 125. As the touch-end event handler may have been configured to trigger the function 260 in response to detecting the touch-end event 346, the content item 155 can perform a registration 370 of the function 260 (e.g., "ExitAPI.exit( )" to navigate to another information resource). The application 145 may then perform an execution 372 of the function 260 (e.g., a navigation to the other information resource). An on-click event may not be triggered as the scroll 364 occurred prior to the release 366. From the perspective of the user, because the triggering of the function 260 is tied to the touch-end event handler instead of the on-click event handler, the execution 352 of the function 260 may appear premature and may be unexpected.

Under process 305D, the functionalities may be similar or the same as the process 300B until the touch-end event 368. At this point, the touch-end event 368 may pass through the interaction verification script 160 to the original touch-end event handler of the content item 155. In response to detecting the touch-end event 368, the content item 155 can perform a registration 370' of the calling of the function 260 and can start a timer to wait for another interaction event corresponding to one of the attached event handlers, in accordance with the interaction verification script 160. As there is no following on-click event passed from the application 145, the interaction verification script 160 can determine that there is no other interaction event detected within the predetermined time window (e.g., 1500 ms). Accordingly, the interaction verification script 160 can restrict the application 145 to perform executing the function 260. In this manner, the premature or unexpected triggering of the function 260 may be prevented.

Figure 4:
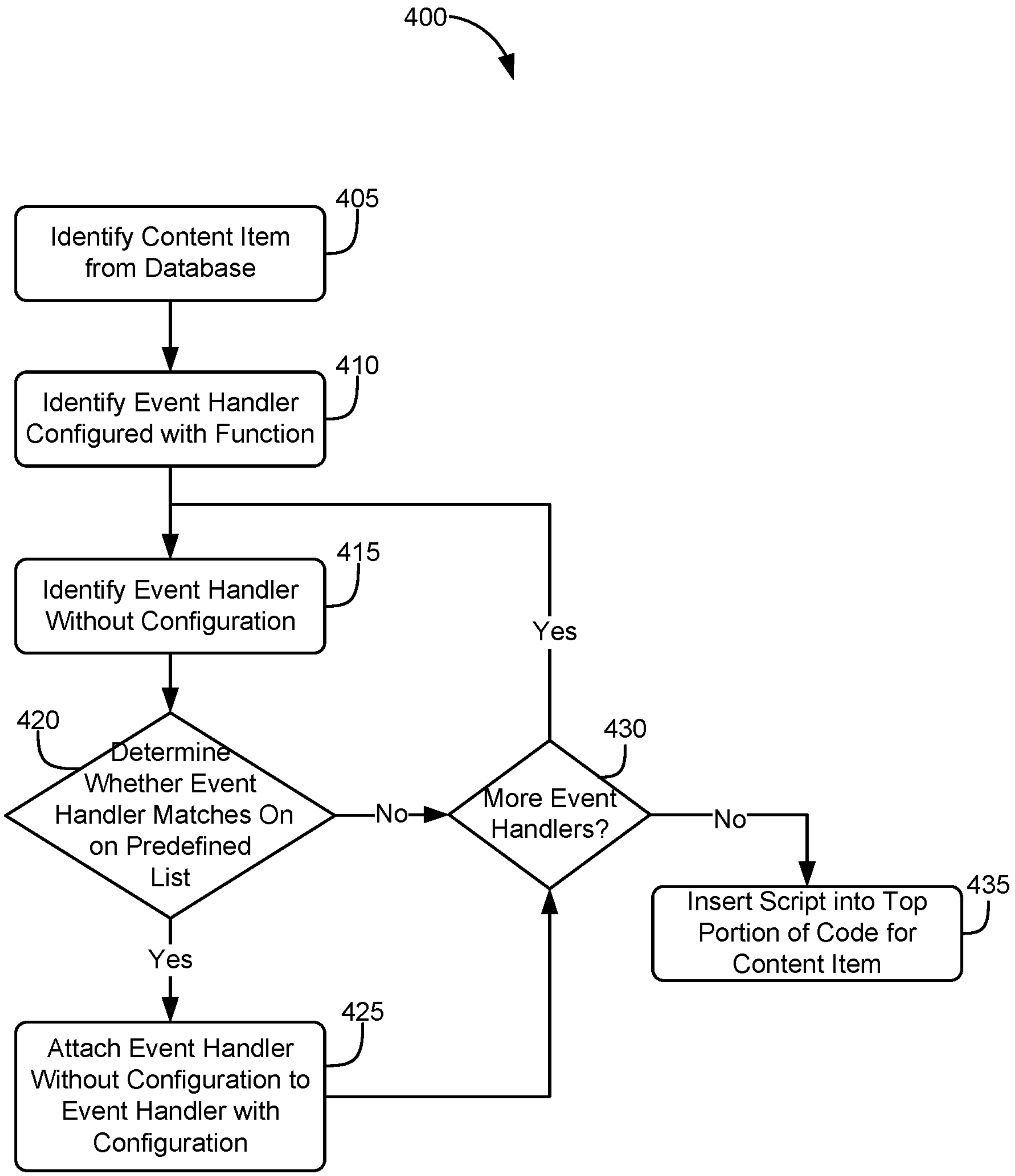
FIG. 4 is a flow diagram of a method of verifying interactions performed on content items, according to an illustrative implementation.
Figure 6:
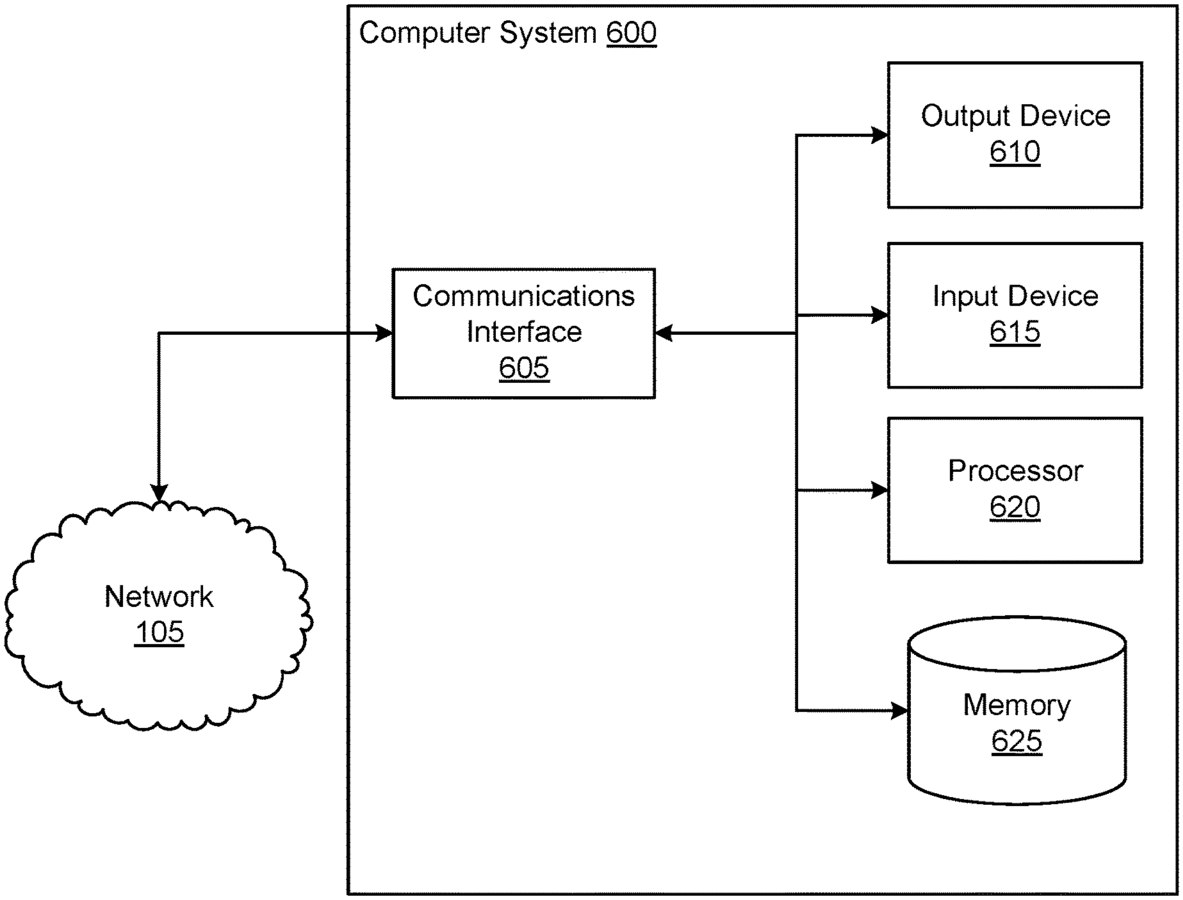
FIG. 6 is a block diagram illustrating a general architecture for a computer system that may be employed to implement elements of the systems and methods described and illustrated herein, according to an illustrative implementation.

Now referring to FIG. 4, depicted is a flow diagram a method 400 of verifying interactions performed on content items. The functionality described herein with respect to method 400 can be performed or otherwise executed by the system 100 as shown on FIG. 1 (e.g., the data processing system 110, the content provider 115, the content publisher 120, and the client device 125) or a computing device as shown in FIG. 6 or any combination thereof.

A data processing system can identify a content item from a database (405). The data processing system can identify an event handler configured with a predesignated function (410). The predesignated function may be one of a predesignated set of functions to be searched for by the data processing system. In some implementations, the function may be defined by an API. The data processing system can identify an event handler without the function (415). The event handler without the configuration may be different from the event handler with the configuration of the function.

The data processing system can determine whether the event handler matches one of a predefined list of handlers (420). Each event handler in the predefined list may be associated with a single, physical interaction on an I/O device of a computing device (e.g., a touch-start event, a touch-end event, and an on-click event). If the event handler is determined to match one of the predefined list of handlers, the data processing system can attach the event handler without the configuration (425). In some implementations, the data processing system can attach the event handler without the configuration and the event handler with the configuration to a script to be inserted into the content item. In either case, the data processing system can determine whether there are more event handlers (430). If there are more event handlers to be analyzed, the data processing system can repeat the functionalities of steps 415-430.

If there are no more event handlers to be analyzed, the data processing system can insert the script with the attachment into a top portion of code for the content item (435). In this manner, when the content item is read and executed by the computing device, the script may be read prior to the code corresponding to the event handlers originally programmed in the content item. The data processing system 400 can provide the content item with the inserted script to the computing device. The content item in turn can be inserted into an information resource presented on the computing device.

Figure 5A:
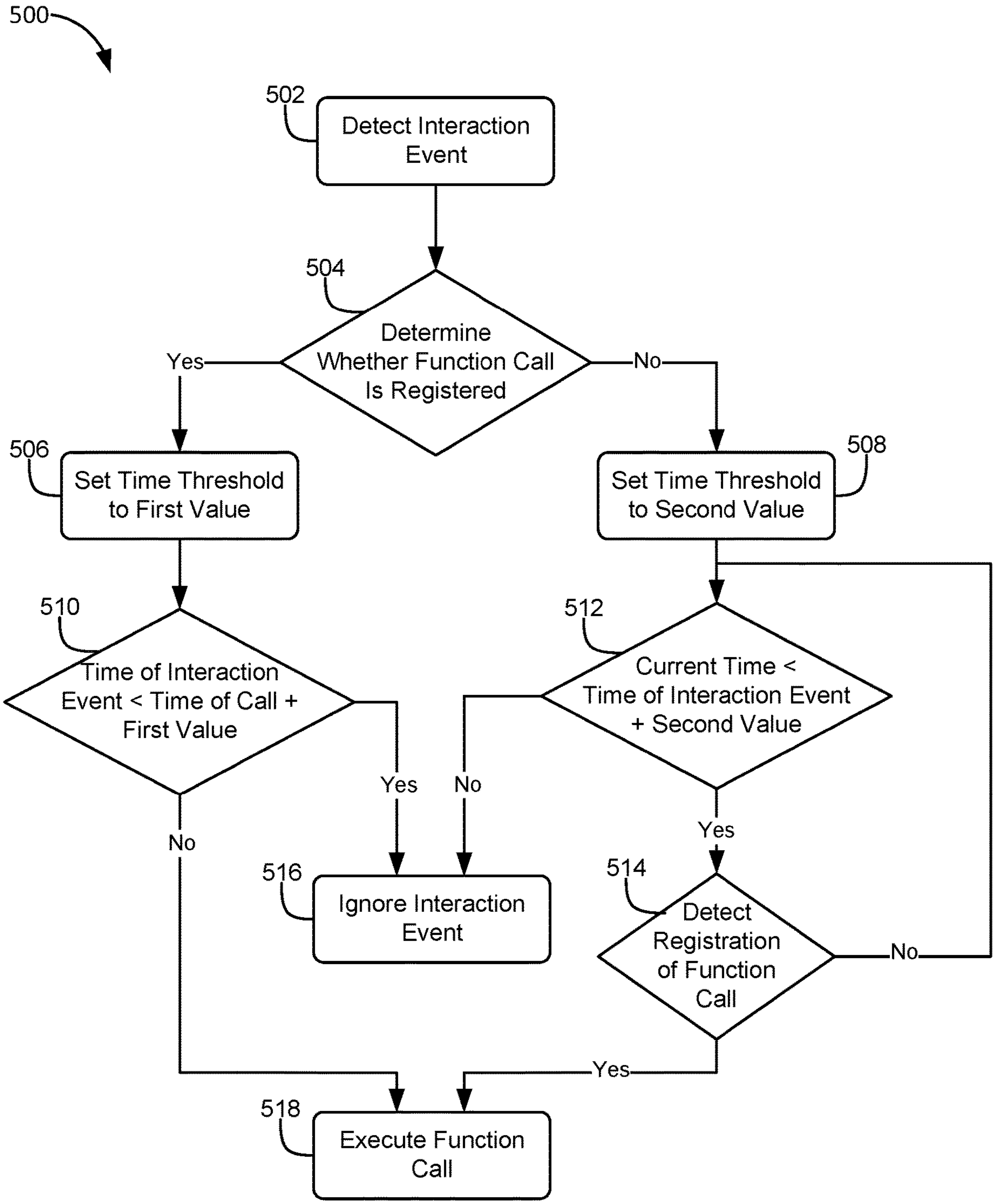
FIGS. 5A and 5B are flow diagrams of a method of verifying interactions performed on content items, according to an illustrative implementation.

Now referring to FIG. 5A depicted is a flow diagram a method 500 of verifying interactions performed on content items. The functionality described herein with respect to method 500 can be performed or otherwise executed by the system 100 as shown on FIG. 1, the system 200 as shown in FIG. 2, or a computing device as shown in FIG. 6 or any combination thereof. In relation to FIG. 4, the method 500 may be a continuation of the method 400 from step 435. The method 500 may correspond to a scenario where the event handler of the content item for the first detected interaction event may lack the configuration of the function to perform the predefined action.

A computing device can detect an interaction event (502). An event handler of the content item for the interaction event may lack the configuration of the function. In some implementations, the computing device can determine that the detected interaction event corresponds to one of a set of attached event handlers. Each event handler in the predefined set may be related to a single interaction by the user of the computing device (e.g., a touch-start event, a touch-end event, and an on-click event). The computing device can determine whether a function call is registered (504). The function may be configured on another event handler different from the event handler corresponding to the detected interaction event. If the function call is registered, the computing device can set a time threshold to a first value (506). The first value may range from 50 ms to 350 ms. On the other hand, if the function call is not registered, the computing device can set a time threshold to a second value (508). The second value may range from 1000 ms to 2000 ms. Both the first value and the second value may be set to account for the amount of time elapsed between the registration of the function call and the detection of the interaction event.

The computing device can determine whether a time of the interaction event is prior to a time of the function call by the first value (510). The computing device can identify the time of the interaction event in response to detection of the interaction. The computing device can identify the time of the function call in response to registration of the function call. The computing device can determine whether a current time is prior to the time of the interaction event by the second value (512). In some implementations, the computing device can maintain a timer to keep track of the current time starting from the time of the detection of the interaction event. The computing device can wait for the detection of the interaction event within the time threshold set to the second value. If the current time is subsequent to the time of the interaction event by the second value, the computing device can monitor for a registration of the function call (514). If the registration of the function call is not detected, the computing device may repeat the functionalities of steps 512 and 514.

If the time of the interaction event is subsequent to the time of the function call by the first value or the current time is subsequent to the time of the interaction event by the second value, the computing device can ignore the interaction event (516). The computing device can also prevent execution of the function call if registered. On the other hand, if the time of the interaction event is subsequent to the time of the function call by the first value or the registration of the function call is detected when the current time is prior to the time of interaction event by the second value, the computing device can execute the function call (518). In some implementations, the computing device can permit the execution of the function call.

Figure 5B:
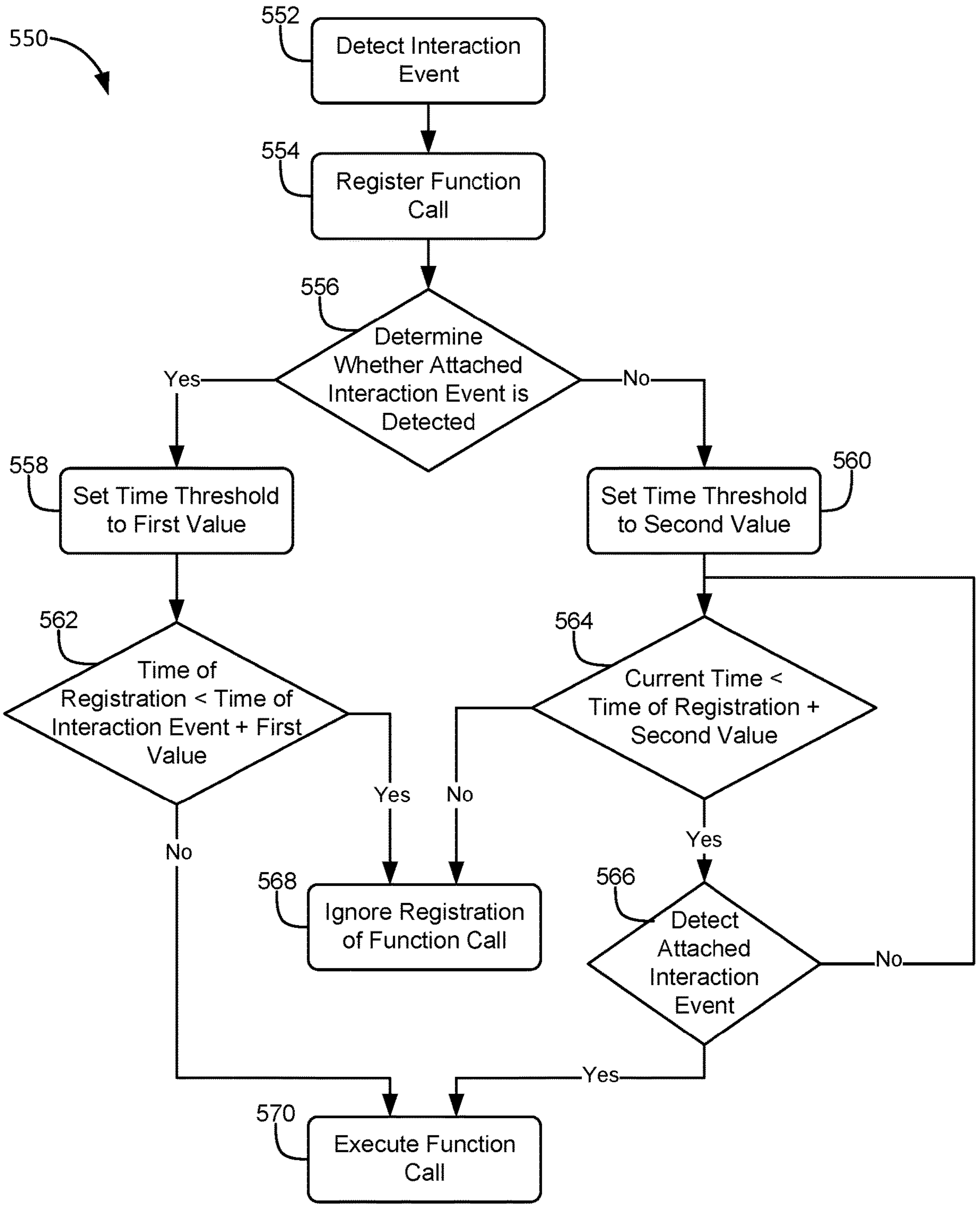

Now referring to FIG. 5B depicted is a flow diagram a method 550 of verifying interactions performed on content items. The functionality described herein with respect to method 550 can be performed or otherwise executed by the system 100 as shown on FIG. 1, the system 200 as shown in FIG. 2, or a computing device as shown in FIG. 6 or any combination thereof. In relation to FIG. 4, the method 550 may be a continuation of the method 400 from step 440. The method 550 may be similar to method 500 detailed above, and may be for the scenario in which the event handler corresponding to the detect interaction event is configured to trigger the function call to perform the predetermined action.

A computing device can detect an interaction event (552). In conjunction with the detection of the interaction event, the computing device can register a function call (554). An event handler of the content item for the interaction event may be configured with the function to perform the predefined action. In some implementations, the computing device can determine that the detected interaction event corresponds to the event handler configured with the function. In some implementations, the computing device can prevent the execution of the function upon registration. The computing device can determine whether an attached interaction event is detected (556). The attached interaction event may be one of a predefined set of attached event handlers. Each event handler in the predefined set may be related to a single interaction by the user of the computing device (e.g., a touch-start event, a touch-end event, and an on-click event). If the attached interaction event is detected, the computing device can set a time threshold to a first value (558). The first value may range from 1000 ms to 2000 ms. On the other hand, if attached interaction event is not detected, the computing device can set a time threshold to a second value (560). The second value may range from 50 ms to 350 ms.

The computing device can determine whether a time of the registration is prior to a time of the attached interaction event by the first value (562). The computing device can identify the time of the interaction event in response to detection of the interaction. The computing device can identify the time of the function call in response to registration of the function call. The computing device can determine whether a current time is prior to the time of the registration by the second value (564). In some implementations, the computing device can maintain a timer to keep track of the current time starting from the time of the detection of the registration of the function call. The computing device can wait for the detection of the attached interaction event within the time threshold set to the second value. If the current time is subsequent to the time of the registration by the second value, the computing device can monitor for the attached interaction event (566).

If the registration of the function call is not detected, the computing device may repeat the functionalities of steps 564 and 566. If the time of the registration is subsequent to the time of the interaction event by the first value or the current time is subsequent to the time of the registration by the second value, the computing device can ignore the interaction event (568). The computing device can also prevent execution of the function call if registered. On the other hand, if the time of the interaction event is prior to the time of the function call by the first value or the registration of the function call is detected when the current time is prior to the time of interaction event by the second value, the computing device can execute the function call (570). In some implementations, the computing device can permit the execution of the function call.

FIG. 6 shows the general architecture of an illustrative computer system 600 that may be employed to implement any of the computer systems discussed herein (including the data processing system 110 and its components, the content provider 115 and its components, the content publisher 120 and its components, and the client device 125 and its components) in accordance with some implementations. The computer system 600 can be used to provide information via the network 105 for display. The computer system 600 of FIG. 6 comprises one or more processors 620 communicatively coupled to memory 625, one or more communications interfaces 605, and one or more output devices 610 (e.g., one or more display units) and one or more input devices 615. The processors 620 can be included in the data processing system 110 or the other components of the data processing system 110. The processors 620 can be included in the content providers 115. The processors 620 can be included in the content publishers 120. The processors 620 can be included in the client device 125 or the other components of the client device 125.

In the computer system 600 of FIG. 6, the memory 625 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 100 of FIG. 1, the data processing system 110 can include the memory 625 to store information related to the availability of one or more content items, among others. The memory 625 can include the database 140. The processor(s) 620 shown in FIG. 6 may be used to execute instructions stored in the memory 625 and, in so doing, also may read from or write to the memory various information processed and or generated pursuant to execution of the instructions.

The processor 620 of the computer system 600 shown in FIG. 6 also may be communicatively coupled to or made to control the communications interface(s) 605 to transmit or receive various information pursuant to execution of instructions. For example, the communications interface(s) 605 may be coupled to a wired or wireless network, bus, or other communication means and may therefore allow the computer system 600 to transmit information to or receive information from other devices (e.g., other computer systems). While not shown explicitly in the system of FIG. 1, 2, or 6, one or more communications interfaces facilitate information flow between the components of the system 600. In some implementations, the communications interface(s) may be configured (e.g., via various hardware components or software components) to provide a website as an access portal to at least some aspects of the computer system 600. Examples of communications interfaces 605 include user interfaces (e.g., webpages), through which the user can communicate with the data processing system 110.

The output devices 610 of the computer system 600 shown in FIG. 6 may be provided, for example, to allow various information to be viewed or otherwise perceived in connection with execution of the instructions. The input device(s) 615 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable a receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, or other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In some implementations, the features may be implemented on a laptop computer or other personal computer, a smartphone, other mobile phone, handheld computer, a tablet PC, or other computing device. In some implementations, the features disclosed herein may be implemented on a wearable device or component (e.g., smart watch) which may include a processing module configured to integrate internet connectivity (e.g., with another computing device or the network 105).

The operations described in this specification can be implemented as operations performed by a data processing apparatus on data stored on one or more computer-readable storage devices or on data received from other sources.

The terms "data processing apparatus", "data processing system", "user device" or "computing device" encompasses all kinds of apparatuses, devices, and machines for processing data, including by way of example a programmable processor, a computer, a system on a chip or multiple chips, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The content item evaluator 130 and the script inserter 135 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from read-only memory or random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well. For example, feedback provided to the user can include any form of sensory feedback, e.g., visual feedback, auditory feedback, or tactile feedback, and input from the user can be received in any form, including acoustic, speech, or tactile input. In addition, a computer can interact with a user by sending documents to and receiving documents from a device that is used by the user, for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as system 600 or system 100 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. The content item 130 and the script inserter 135 can be part of the data processing system 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description, or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to verifying interactions performed on content items and deploying countermeasures thereto, the systems and methods described herein can include applied to other environments. The foregoing implementations are illustrative rather than limiting of the described systems and methods. The scope of the systems and methods described herein is thus indicated by the appended claims, rather than the foregoing description, and changes that come within the meaning and range of equivalency of the claims are embraced therein.

What is claimed is:

1. A method of verifying interactions performed on content items, comprising:
- inserting, by a data processing system having one or more processors, an interaction verification script at a first portion of code of a content item, the interaction verification script configured to:
  - detect a first interaction event attributed to the content item, the first interaction event passed to the script by an application configured to present the content item on an information resource on which the content item is presented responsive to the application detecting an interaction with the content item;
  - identify, via execution of a second portion of code of the content item, a registration of a function call to perform a predetermined action, the function call triggered in response to the application passing a second interaction event to the content item, the second interaction event attributed to the content item and generated in response to the interaction with the content item;
  - determine that an amount of time between detecting the first interaction event and identifying the registration of the function call is less than a predetermined threshold; and
  - cause the application to perform the predetermined action in response to determining that the amount of time between detecting the first interaction event and identifying the registration of the function call is less than the predetermined threshold.

2. The method of claim 1, wherein the interaction verification script is further configured to:
- detect the first interaction event including a first on-click event attributed to the content item subsequent to a touch-start event and a touch-end event, the first on-click event processed by an on-click event handler of the content item;
- detect the second interaction event including a second on-click event attributed to the content item subsequent to the first on-click event, the second on-click event processed by the on-click event handler of the content item; and
- determine that the amount of time between the second on-click event and the first on-click event is less than the predetermined threshold.

3. The method of claim 1, wherein the interaction verification script is further configured to:
- detect the second interaction event including a touch-end event attributed to the content item, the touch-end event processed by a touch-end event handler of the content item, the touch-end event handler for the touch-end event configured with the function call to perform the predetermined action;
- register, responsive to detecting the touch-end event, the function call for performing the predetermined action without executing the predetermined action; and
- detect the first interaction event including an on-click event attributed to the content item subsequent to the touch-end event, the on-click event processed by an on-click event handler of the content item.

4. The method of claim 1, wherein the interaction verification script is further configured to:
- determine, responsive to the detection of the first interaction event, that the detection of the first interaction event precedes the registration of the function call; and
- set the predetermined threshold based on the determination that the detection of the first interaction event precedes the registration of the function call.

5. The method of claim 1, wherein the interaction verification script is further configured to:
- detect the first interaction event attributed to the content item via a first event handler for processing a first type of interaction corresponding to the first interaction event; and
- detect the second interaction event attributed to the content item via a second event handler for processing at least one of the first type of interaction and a second type of interaction corresponding to the second interaction event.

6. The method of claim 1, wherein the interaction verification script is further configured to cause the application to perform the predetermined action via an application program interface (API) function call.

7. The method of claim 1, further comprising:

identifying, by the data processing system, an event handler for processing the second interaction event in the second portion of code of the content item matching one of the plurality of predetermined event handlers for performing the predetermined action, the event handler pre-configured to perform the predetermined function;

wherein inserting the interaction verification script further comprises attaching the event handler to a predetermined plurality of event handlers in the first portion of the code of the content item, the first portion of code to be executed by the application running on the client prior to execution of the second portion of code.

8. A system for verifying interactions performed on content items, comprising:

a computing device having one or more processors coupled with memory storing instructions encoded in a first portion of code of a content item, configured to:

detect a first interaction event attributed to the content item, the first interaction event passed by an application configured to present the content item on an information resource on which the content item is presented responsive to the application detecting an interaction with the content item;

identify, via execution of a second portion of code of the content item, a registration of a function call to perform a predetermined action, the function call configured to be triggered in response to the application passing a second interaction event to the content item, the second interaction event attributed to the content item and generated in response to the interaction with the content item; and determine that an amount of time between detecting the first interaction event and identifying the registration of the function call is less than a predetermined threshold, and cause the application to perform the predetermined action in response to determining that the amount of time between detecting the first interaction event and identifying the registration of the function call is less than the predetermined threshold.

9. The system of claim 8, wherein the computing device is further configured to:

detect the first interaction event including a first on-click event attributed to the content item subsequent to a touch-start event and a touch-end event;

detect the second interaction event including a second on-click event attributed to the content item subsequent to the first on-click event, the second on-click event processed by the on-click event handler of the content item, the event handler for the second on-click event configured with the function call to perform the predetermined action, and identify the registration of the function call, in response to the detection of the second interaction event including the second on-click event attributed to the content item.

10. The system of claim 8, wherein the computing device is further configured to:

detect the first interaction event including an on-click event attributed to the content item subsequent to the touch-end event, the on-click event processed by an on-click event handler of the content item;

detect the second interaction event including a touch-end event attributed to the content item, the touch-end event processed by a touch-end event handler of the content item, the touch-end event handler for the touch-end event configured with the function call to perform the predetermined action; and identify the registration of the function call, in response to the detection of the second interaction event including the touch-end event handler.

11. The system of claim 8, wherein the computing device is further configured to:

identify the first interaction event as paired with the second interaction event from a plurality of attached interaction events, the plurality of attached interaction events including at least one of an on-click event and a touch-end events; and determine that the amount of time between detecting the first interaction event and identifying the registration of the function call associated is less than the predetermined threshold, responsive to identifying the first interaction event as paired with the second interaction event.

12. The system of claim 8, wherein the computing device is further configured to:

determine that the detection of the first interaction event precedes the registration of the function call;

set the predetermined threshold based on the determination that the detection of the first interaction event precedes the registration of the function call; and cause the application to perform the predetermined action in response to determining that the amount of time is less than the predetermined threshold subsequent to the detection of the second interaction event.

13. The system of claim 8, wherein the computing device is further configured to:

determine that the detection of the first interaction event succeeds the registration of the function call;

set the predetermined threshold based on the determination that the detection of the first interaction event succeeds the registration of the function call; and cause the application to perform the predetermined action in response to determining that the amount of time is less than the predetermined threshold subsequent to the detection of the first interaction event.

14. The system of claim 8, wherein the instructions are executed by the application prior to the execution of the second portion of code of the content item.

15. A method of verifying interactions performed on content items, comprising:

detecting, by an interaction verifier encoded in a first portion of code of a content item and executing on one or more processors, a first interaction event attributed to the content item, the first interaction event passed by an application configured to present the content item on an information resource on which the content item is presented responsive to the application detecting an interaction with the content item;

identifying, by the interaction verifier, via execution of a second portion of code of the content item, a registration of a function call to perform a predetermined action, the function call configured to be triggered in response to the application passing a second interaction event to the content item, the second interaction event attributed to the content item and generated in response to the interaction with the content item;

determining, by the interaction verifier, that an amount of time between detecting the first interaction event and identifying the registration of the function call is less than a predetermined threshold; and causing, by the interaction verifier, the application to perform the predetermined action in response to determining that the amount of time between detecting the first interaction event and identifying the registration of the function call is less than the predetermined threshold.

16. The method of claim 15, wherein detecting the first interaction event further comprises detecting the first interaction event including a first on-click event attributed to the content item subsequent to a touch-start event and a touch-end event; and further comprising:

detecting, by the interaction verifier, the second interaction event including a second on-click event attributed to the content item subsequent to the first on-click event, the second on-click event processed by the on-click event handler of the content item, the event handler for the second on-click event configured with the function call to perform the predetermined action; and wherein identifying the registration of the function call further comprises identifying the registration of the function call, in response to the detection of the second interaction event including the second on-click event attributed to the content item.

17. The method of claim 15, wherein detecting the first interaction event further comprises detecting the first interaction event including an on-click event attributed to the content item subsequent to the touch-end event, the on-click event processed by an on-click event handler of the content item; and further comprising:

detecting, by the interaction verifier, the second interaction event including a touch-end event attributed to the content item, the touch-end event processed by a touch-end event handler of the content item, the touch-end event handler for the touch-end event configured with the function call to perform the predetermined action; and wherein identifying the registration of the function call further comprises identifying the registration of the function call, in response to the detection of the second interaction event including the touch-end event handler.

18. The method of claim 15, further comprising:

identifying, by the interaction verifier, the first interaction event as paired with the second interaction event from a plurality of attached interaction events, the plurality of attached interaction events including at least one of an on-click event and a touch-end events; and wherein determining that the amount of time is less than the predetermined threshold further comprises determining that the amount of time between detecting the first interaction event and identifying the registration of the function call associated is less than the predetermined threshold, responsive to identifying the first interaction event as paired with the second interaction event.

19. The method of claim 15, further comprising:

determining, by the interaction verifier, that the detection of the first interaction event precedes the registration of the function call; and setting, by the interaction verifier, the predetermined threshold based on the determination that the detection of the first interaction event precedes the registration of the function call; and wherein causing the application to perform the predetermined action further comprises causing the application to perform the predetermined action in response to determining that the amount of time is less than the predetermined threshold subsequent to the detection of the second interaction event.

20. The method of claim 15, further comprising:

determining, by the interaction verifier, that the detection of the first interaction event succeeds the registration of the function call; and setting, by the interaction verifier, the predetermined threshold based on the determination that the detection of the first interaction event succeeds the registration of the function call; and wherein causing the application to perform the predetermined action further comprises causing the application to perform the predetermined action in response to determining that the amount of time is less than the predetermined threshold subsequent to the detection of the first interaction event.

* * * * *